US012768513B2

(12) United States Patent
Wang

(10) Patent No.: US 12,768,513 B2
(45) Date of Patent: Oct. 20, 2026

(54) GRATING-SHEET INSERT MODULE, LASER LAMP, AND LAWN LAMP

(71) Applicant: X PHOTOELECTRIC TECHNOLOGY(SZ)CO., LTD., Shenzhen (CN)

(72) Inventor: Lijian Wang, Shenzhen (CN)

(73) Assignee: X PHOTOELECTRIC TECHNOLOGY(SZ)CO., LTD., Shenzhen (CN)

( * ) Notice: Subject to any disclaimer, the term of this patent is extended or adjusted under 35 U.S.C. 154(b) by 135 days.

(21) Appl. No.: 18/791,375

(22) Filed: Jul. 31, 2024

(65) Prior Publication Data

US 2026/0029105 A1 Jan. 29, 2026

(30) Foreign Application Priority Data

Jul. 25, 2024 (CN) ......................... 202411012896.5
Jul. 25, 2024 (CN) ......................... 202421789789.9

(51) Int. Cl.

| | |
|---|---|
| ***F21V 14/08*** | (2006.01) |
| ***F21S 8/08*** | (2006.01) |
| ***F21V 11/00*** | (2015.01) |
| ***F21V 17/02*** | (2006.01) |
| ***F21W 121/00*** | (2006.01) |

(52) U.S. Cl.
CPC ............... *F21V 11/00* (2013.01); *F21S 8/081* (2013.01); *F21V 14/08* (2013.01); *F21V 17/02* (2013.01); *F21W 2121/008* (2013.01)

(58) Field of Classification Search
CPC ........ F21V 14/08; F21V 14/085; F21S 8/081; F21S 8/083; F21W 2121/008
See application file for complete search history.

(56) References Cited

U.S. PATENT DOCUMENTS 12,000,564 B1 * 6/2024 Zheng ..................... F21V 11/12
2022/0243895 A1 * 8/2022 Xu ............................ F21V 7/10

* cited by examiner

*Primary Examiner* — Sean P Gramling

(57) ABSTRACT

A grating-sheet insert module and a laser lamp are disclosed. The grating-sheet insert module includes an insert tongue, defining a mounting hole extending through the insert tongue and an avoiding groove in communication with the mounting hole, the avoiding groove extending to an edge of the insert tongue; and a grating insert, arranged in the mounting hole, in contact with a hole wall of the mounting hole, configured to be rotatable around a central axis of the mounting hole, the grating insert including a grating sheet configured to enable light entering the mounting hole to transmit therethrough.

19 Claims, 14 Drawing Sheets

GRATING-SHEET INSERT MODULE, LASER LAMP, AND LAWN LAMP

CROSS REFERENCE TO RELATED APPLICATIONS

The present disclosure claims priority to Chinese Patent Application No. 202411012896.5 filed Jul. 25, 2024 and Chinese Patent Application No. 202421789789.9 filed Jul. 25, 2024, the contents of which are herein incorporated by reference in their entireties.

TECHNICAL FIELD

The present disclosure relates to the field of laser lamps, in particular to a grating-sheet insert module, a laser lamp, and a lawn lamp.

BACKGROUND

A laser lamp may be used indoors or outdoors. When used, the laser lamp may present festive atmosphere in a stage, a vehicle, and other environmental places, and may be configured to decorate. However, laser lamps in the related art have a single display effect due to an irreplaceable grating.

SUMMARY

A technical solution of the present disclosure provides a grating-sheet insert module. The grating-sheet insert module includes an insert tongue, defining a mounting hole extending through the insert tongue and an avoiding groove in communication with the mounting hole, the avoiding groove extending to an edge of the insert tongue; and a grating insert, arranged in the mounting hole, in contact with a hole wall of the mounting hole, configured to be rotatable around a central axis of the mounting hole, the grating insert including a grating sheet configured to enable light entering the mounting hole to transmit therethrough.

Another technical solution of the present disclosure provides a laser lamp. The laser lamp includes the grating-sheet insert module mentioned above; a laser module, configured to emit the light; and a drive module, partially arranged in the avoiding groove, in transmission connection with a portion of the grating insert located in the mounting hole, and configured to drive the grating insert to rotate around the central axis of the mounting hole.

Still another technical solution of the present disclosure provides a lawn lamp. The lawn lamp includes a mounting housing; a mounting bracket, received in the mounting housing; a laser module, mounted on the mounting bracket and configured to emit light; a grating-sheet insert module, comprising: an insert tongue, detachably connected to the mounting housing and defining a mounting hole extending through the insert tongue; and a grating insert, detachably arranged in the mounting hole, configured to enable the light emitted by the laser module to transmit therethrough, and rotatable around a central axis of the mounting hole; and a drive module, arranged on the mounting bracket, in transmission connection with the grating insert, and configured to drive the grating insert to rotate around the central axis of the mounting hole.

BRIEF DESCRIPTION OF THE DRAWINGS

In order to make the technical solutions described in embodiments of the present disclosure more clearly, the drawings used for description of some embodiments are described. Apparently, the drawings in the following description only illustrate some embodiments of the present disclosure. For those skilled in the art, other drawings may be acquired according to the drawings without any creative work.

DETAILED DESCRIPTIONS

The technical solutions in embodiments of the present disclosure are clearly and completely described in conjunction with the drawings in the embodiments of the present disclosure. It is obvious that the described embodiments are only some embodiments of the present disclosure, and not all embodiments. All other embodiments acquired by those skilled in the art based on the embodiments in the present disclosure without the creative work are all within the scope of the present disclosure.

Figure 1:
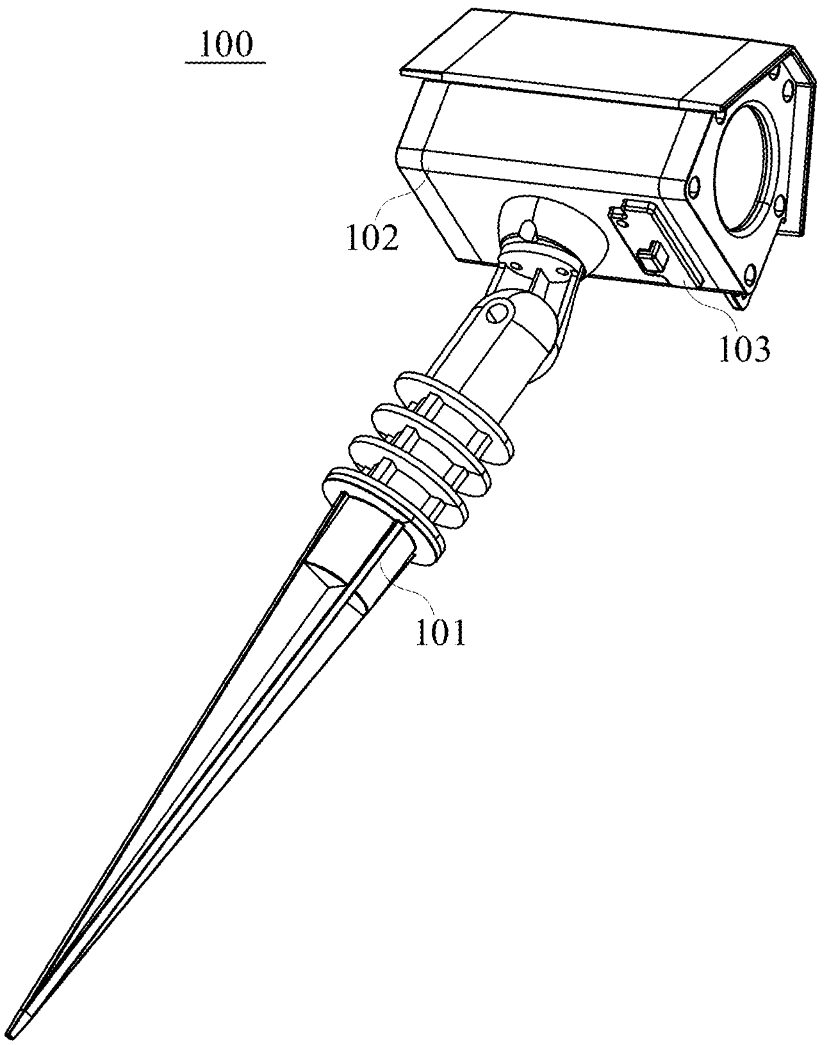
FIG. 1 is a structural schematic view of a laser lamp according to some embodiments of the present disclosure.

Some embodiments of the present disclosure provide a laser lamp, the laser lamp may create atmosphere by projecting patterns, beams, or the like. The laser lamp may create stars effect. As shown in FIG. 1, FIG. 1 is a structural schematic view of a laser lamp according to some embodiments of the present disclosure. A laser lamp 100 may include a ground insert 101 which is insertable and fixable in the ground, a mounting housing 102 rotatably connected to the ground insert 101, and a projection assembly 103 arranged in the mounting housing 102. The mounting housing 102 may be fixed to the ground through the ground insert 101, so that the ground insert 101 may support the mounting housing 102. In some embodiments, the mounting housing 102 may be fixed to the ground insert 101 through inserting, welding, screwing, or snapping instead of rotatable connection. In addition, the mounting housing 102 may be supported and fixed to the ground through other supporting structures instead of the ground insert 101. In some embodiments, the laser lamp 100 may not be fixed to the ground, but may be fixed to other structures. In some embodiments, the ground insert 101 may be omitted. The projection assembly 103 is arranged in the mounting housing 102 and may project light to the outside of the mounting housing 102 to form patterns, or light beams, etc. to create the atmosphere. The projection component 103 may create the stars effect.

Figure 2:
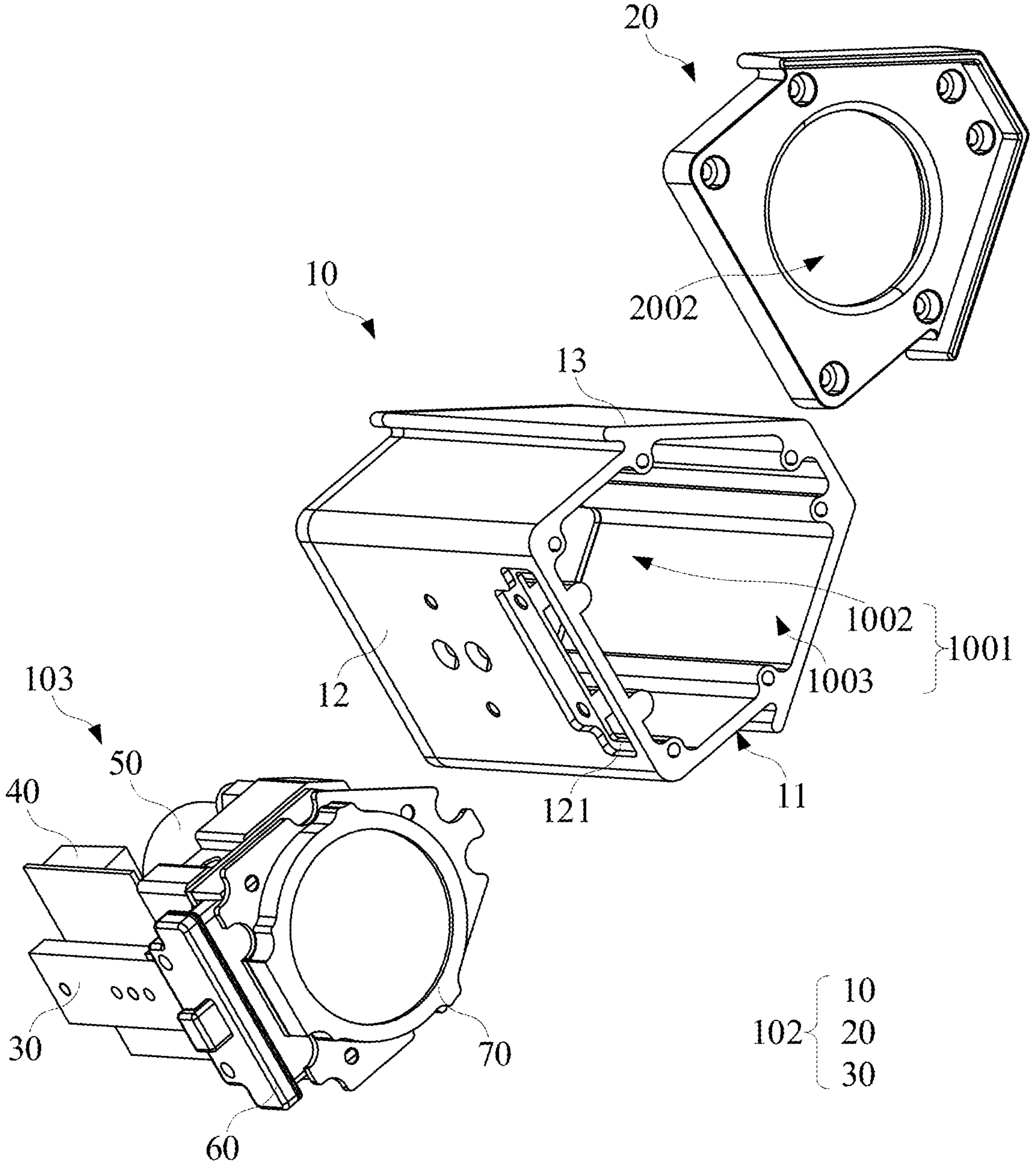
FIG. 2 is a structural schematic view illustrating cooperation between a mounting housing and a projection assembly shown in FIG. 1 according to some embodiments of the present disclosure.

As shown in FIG. 2, FIG. 2 is a structural schematic view illustrating cooperation between the mounting housing 102 and the projection assembly 103 shown in FIG. 1 according to some embodiments of the present disclosure. The mounting housing 102 may include a housing body 10 rotatably connected to the ground insert 101 and a housing cover 20 engaged with the housing body 10 to define a mounting space 1001. The mounting space 1001 may be configured to accommodate the projection assembly 103.

The housing body 10 may be a housing structure with the mounting space 1001. The housing body 10 defines a mounting opening 11. The mounting opening 11 is in communication with or fluidly coupled to the mounting space 1001, and the housing cover 20 is arranged at the mounting opening 11.

The housing body 10 may include a mounting plate 12. A first part of surface of the mounting plate 12 may be arranged in the mounting space 1001 and configured as an inner surface of the housing body 10. A second part of the surface of the mounting plate 12 may be partially arranged out of the mounting space 1001 and configured as an outer surface of the housing body 10.

In some embodiments, the mounting plate 12 may be rotatably connected to the ground insert 101.

In some embodiments, the mounting plate 12 may be configured to mount the projection assembly 103.

In some embodiments, a side of the mounting plate 12 close to the housing cover 20 defines an insert hole 121 extending through the mounting plate 12, and the insert hole 121 is configured to cooperate with and be engaged with the projection assembly 103. The insert hole 121 may be in communication with the mounting space 1001.

The housing body 10 may include an assembly plate 13. A first part of a surface of the assembly plate 13 may be arranged in the mounting space 1001 and configured as an inner surface of the housing body 10. A second part of the surface of the assembly plate 13 may be arranged outside the mounting space 1001 and configured as an outer surface of the housing body 10. In some embodiments, the assembly plate 13 may be connected to the mounting plate 12 or may be spaced apart from the mounting plate 12. In some embodiments, the assembly plate 13 is located farther away from the ground insert 101 than the mounting plate 12. In some embodiments, the assembly plate 13 may be located above the mounting plate 12 in a vertical direction when the laser lamp 100 is used. That is, the assembly plate 13 is higher than the mounting plate 12 in height.

A shown in FIG. 2, the housing cover 20 may cover the mounting opening 11 of the housing body 10. In some embodiments, the housing cover 20 may be connected to the housing body 10 through snapping, welding, screwing, bonding, or the like. In some embodiments, the connection between the housing cover 20 and the housing body 10 may block the mounting opening 11 to seal the mounting space 1001.

Figure 3:
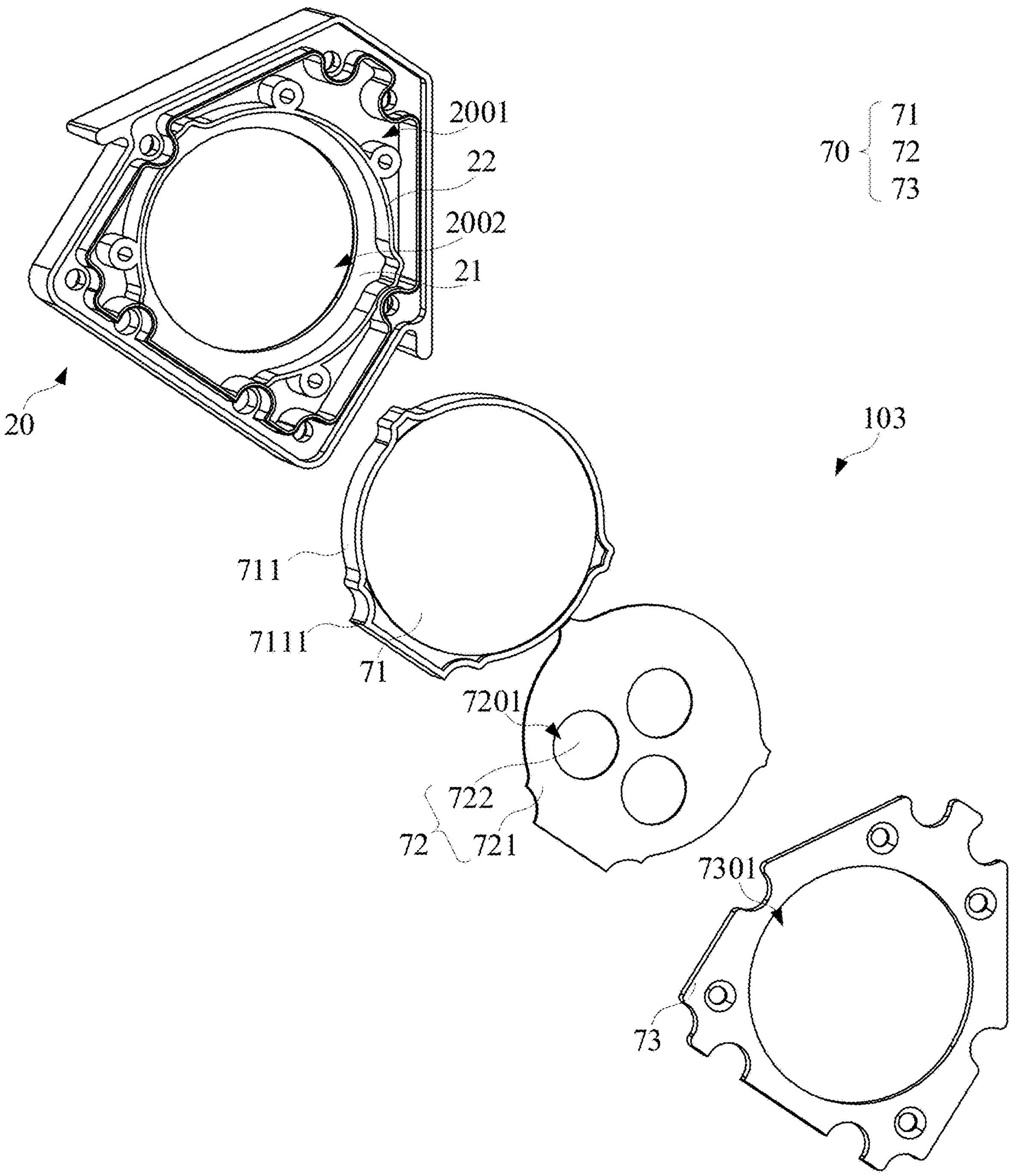
FIG. 3 is a structural schematic view illustrating cooperation between a part of the projection assembly and a housing cover shown in FIG. 2.

A shown in FIG. 3, FIG. 3 is a structural schematic view illustrating cooperation between a part of the projection assembly 103 and the housing cover 20 shown in FIG. 2. A side of the housing cover 20 facing the housing body 10 defines a mounting groove 2001 to cooperate with or engage with the projection assembly 103.

In some embodiments, the housing cover 20 may define a light outlet 2002 extending through the housing cover 20. The light outlet 2002 is in communication with the mounting space 1001, so that light emitted by the projection assembly 103 is emitted out of the mounting space 1001 through the light outlet 2002. In some embodiments, the light outlet 2002 is defined on a groove bottom 21 of the mounting groove 2001.

The mounting groove 2001 may include an engaging wall 22 configured to engage with the projection assembly 103 to limit a position of the projection assembly 103. In some embodiments, the engaging wall 22 is arranged on the groove bottom 21 of the mounting groove 2001. The engaging wall 22 extends toward the side close to the housing body 10. In some embodiments, the engaging wall 22 may be omitted, and the projection assembly 103 may be engaged in a side wall defining the mounting groove 2001. In some embodiments, the engaging wall 22 may be of an annular structure. In some embodiments, the engaging wall 22 is arranged around or surrounds a periphery of the light outlet 2002.

Figure 4:
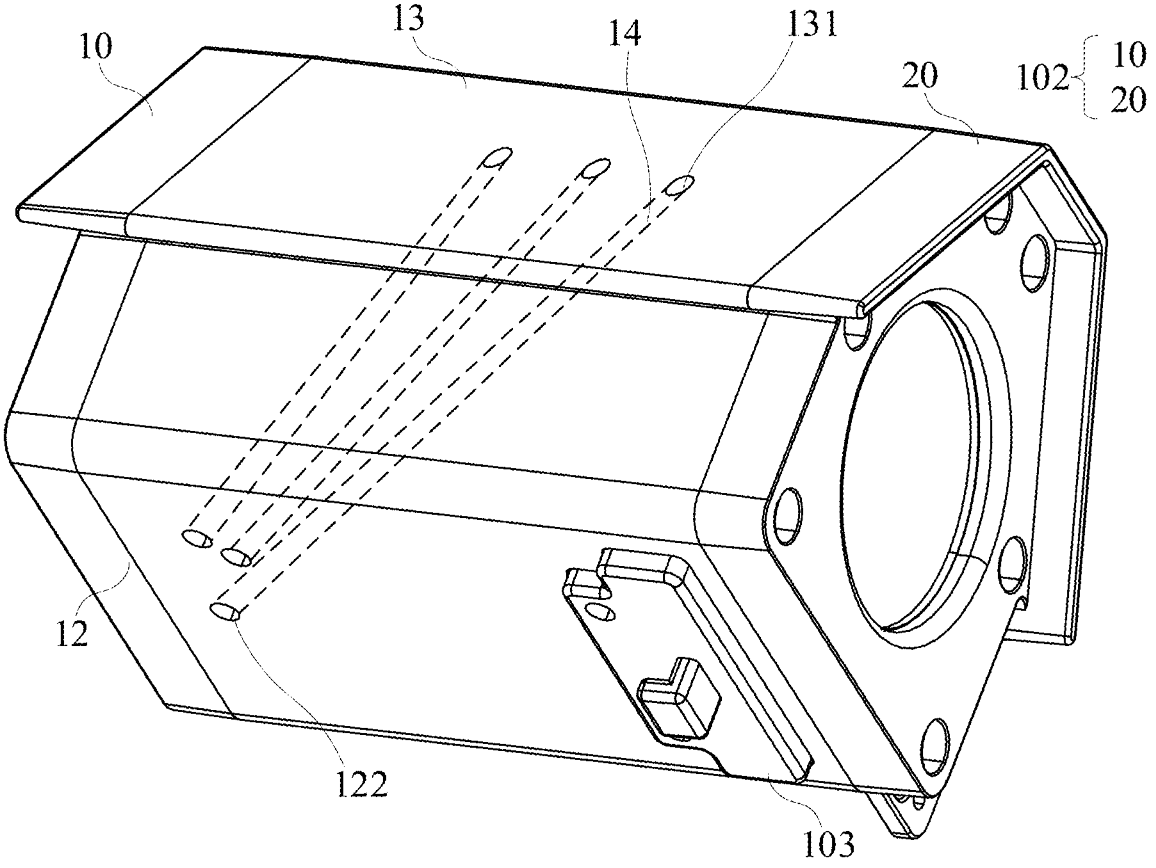
FIG. 4 is a structural schematic view illustrating cooperation between a mounting housing and a projection assembly shown in FIG. 1 according to some embodiments of the present disclosure.

As shown in FIG. 4, FIG. 4 is a structural schematic view illustrating cooperation between the mounting housing 102 and the projection assembly 103 shown in FIG. 1 according to some embodiments of the present disclosure. The housing body 10, such as the mounting plate 12, may define an air inlet 122. In some embodiments, the air inlet 122 may extend through the mounting plate 12. The air inlet 122 may be in communication with the mounting space 1001.

The housing body 10, such as the assembly plate 13, may define an air outlet 131. In some embodiments, the air outlet 131 may extend through the assembly plate 13. The air outlet 131 may be in communication with the mounting space 1001.

In some embodiments, the air outlet 131 is located farther from the ground insert 101 than the air inlet 122. In some embodiments, the air inlet 122 may be defined on other positions of the housing body 10 instead of the mounting plate 12. In some embodiments, the air outlet 131 may be defined on other positions of the housing body 10 instead of the assembly plate 13.

In some embodiments, when the laser lamp 100 is in use, the air outlet 131 may be located vertically above the air inlet 122. In other words, the air outlet 131 is higher than the air inlet 122 in height.

A heat dissipation tube 14 may be disposed on the mounting housing 102, such as the housing body 10. One end of the heat dissipation tube 14 is connected to the air inlet 122, and the other end of the heat dissipation tube 14 is connected to the air outlet 131, so that the air may enter the heat dissipation tube 14 from the air inlet 122 and then exit out of the heat dissipation tube 14 via the air outlet 131. When the air in the heat dissipation tube 14 is heated, it flows in the heat dissipation tube 14 and flows to a higher position, and further exits out of the heat dissipation tube 14 via the air outlet 131. When the air flows in the heat dissipation tube 14, negative pressure may be generated in the heat dissipation tube 14, so that the air enters the heat dissipation tube 14 from the air inlet 122, thereby achieving heat dissipation for the projection assembly 103.

In some embodiments, the heat dissipation tube 14 is arranged in a housing wall of the housing body 10. In some embodiments, the heat dissipation tube 14 is arranged in the mounting space 1001. In some embodiments, the air inlet 122 and the air outlet 131 are not in communication with the mounting space 1001.

Figure 5:
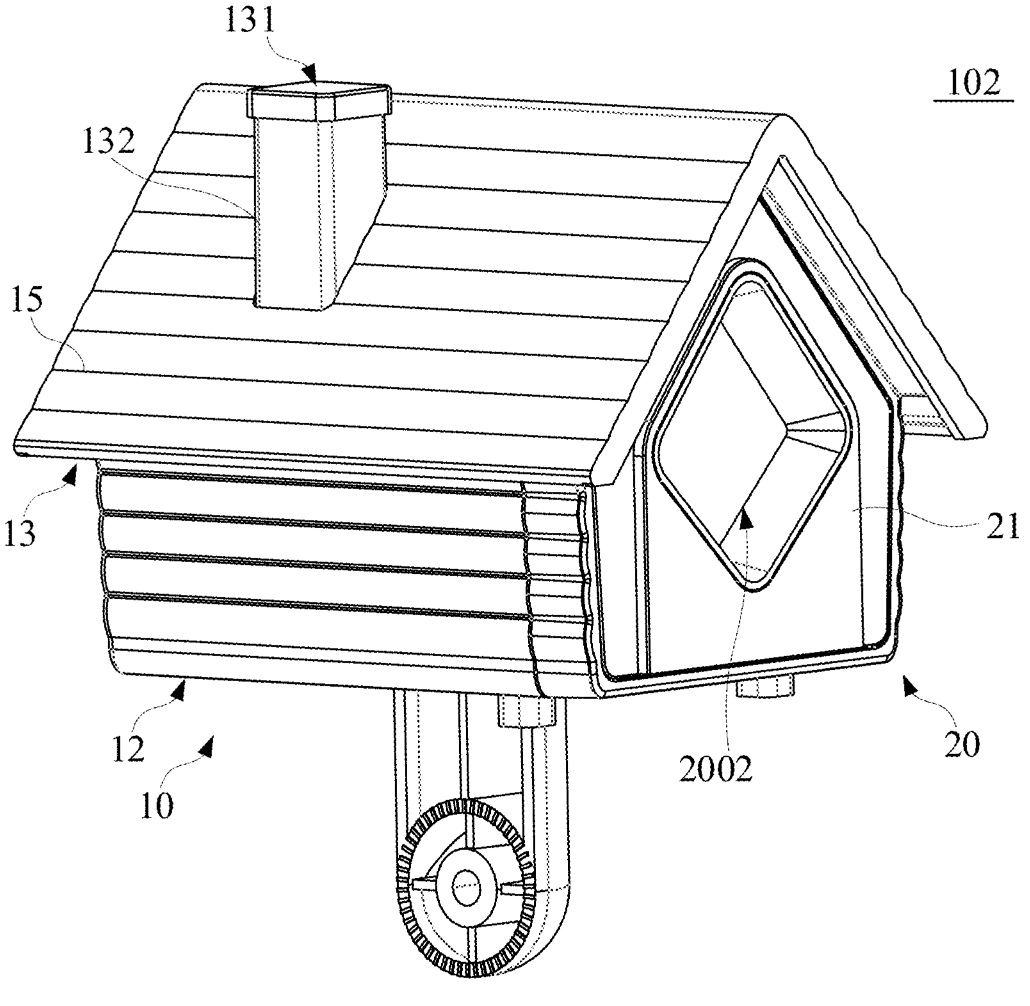
FIG. 5 is a structural schematic view illustrating cooperation of the mounting housing shown in FIG. 4 according to some embodiments of the present disclosure.

As shown in FIG. 5, FIG. 5 is a structural schematic view illustrating cooperation of the mounting housing 102 shown in FIG. 4 according to some embodiments of the present disclosure. The mounting housing 102, such as the housing body 10, may include a functional member 15. The functional member 15 may be arranged on the outer surface of the assembly plate 13 through fixed connection such as welding, bonding, snapping, or screwing, etc. The functional member 15 may have a decorative effect and a waterproof effect. In some embodiments, the functional member 15 may extend to the housing cover 20 to be fixedly connected to the housing cover 20 through welding, bonding, snapping, or screwing, etc. In some embodiments, the functional member 15 may seal a gap between the housing body 10 and the housing cover 20. In some embodiments, the functional member 15 and the assembly plate 13 may be a one-piece structure.

In some embodiments, the mounting housing 102 may be house-shaped. In some embodiments, a decorative column 132 may be arranged on the assembly plate 13, and may be chimney-shaped. In some embodiments, the trim column 132 may penetrate the functional member 15. In some embodiments, the decorative column 132 may be arranged on the functional member 15 instead of the assembly plate 13. In some embodiments, the air outlet 131 may be defined on the decorative column 132.

As shown in FIG. 2, the projection assembly 103 may include a mounting bracket 30 arranged in the mounting housing 102, such as a mounting space 1001, a laser module 40 arranged on the mounting bracket 30 and configured to emit light that may be transmitted in a transmission path, a drive module 50 arranged on the mounting bracket 30, a grating-sheet insert module 60 arranged in the transmission path and cooperating with the laser module 40 and the drive module 50, and a grating module 70 arranged in the transmission path and cooperating with the laser module 40 and the grating-sheet insert module 60. The laser module 40 may emit the light. The light is configured to successively transmit through the grating-sheet insert module 60 and the grating module 70 along the transmission path, and then the patterns, light beams or the like are projected under the cooperation between the grating-sheet insert module 60 and the grating module 70 to create atmosphere or the stars effect. The drive module 50 is in transmission connection with the grating-sheet insert module 60 to adjust the grating-sheet insert module 60, thereby adjusting the display effect of the laser lamp 100.

Figure 6:
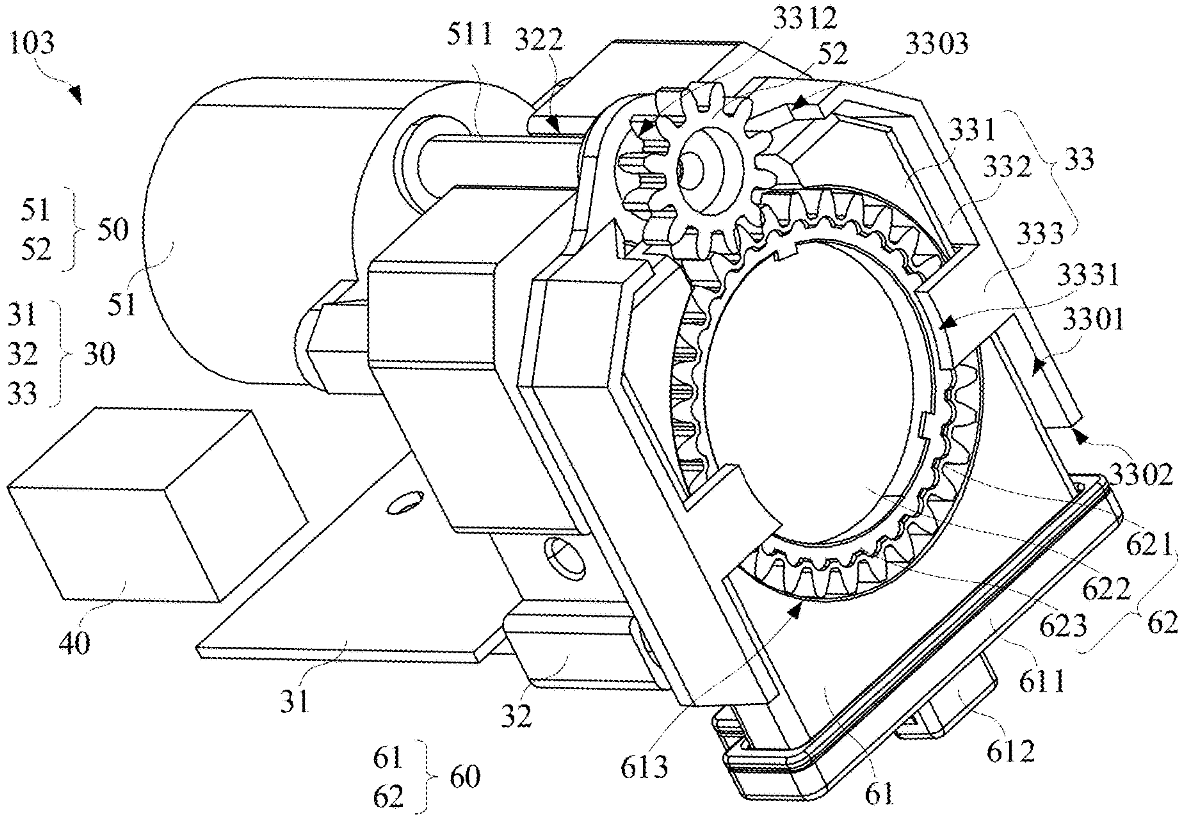
FIG. 6 is a structural schematic view of a part of the projection assembly shown in FIG. 2 according to some embodiments of the disclosure.
Figure 7:
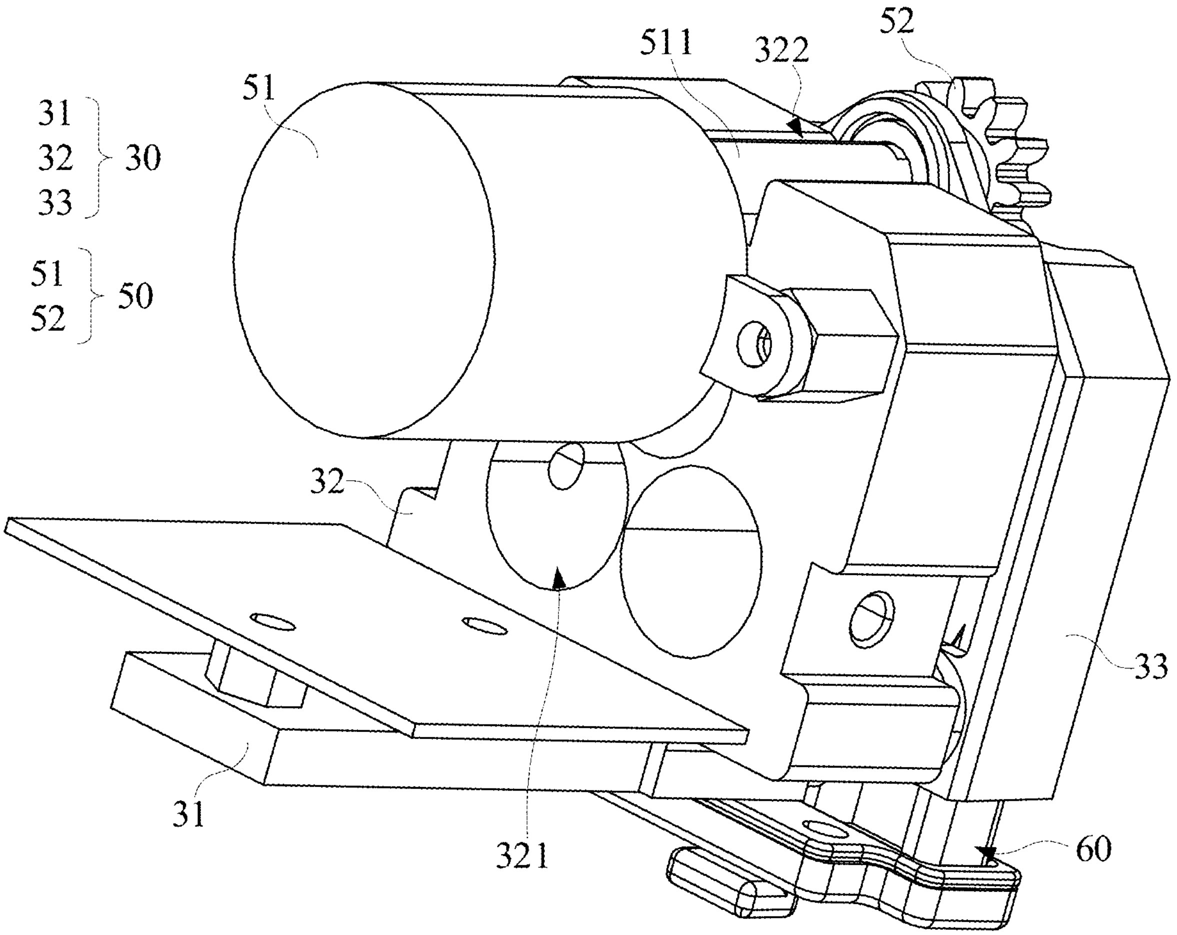
FIG. 7 is a structural schematic view of a part of the projection assembly shown in FIG. 2 according to some embodiments of the disclosure.
Figure 8:
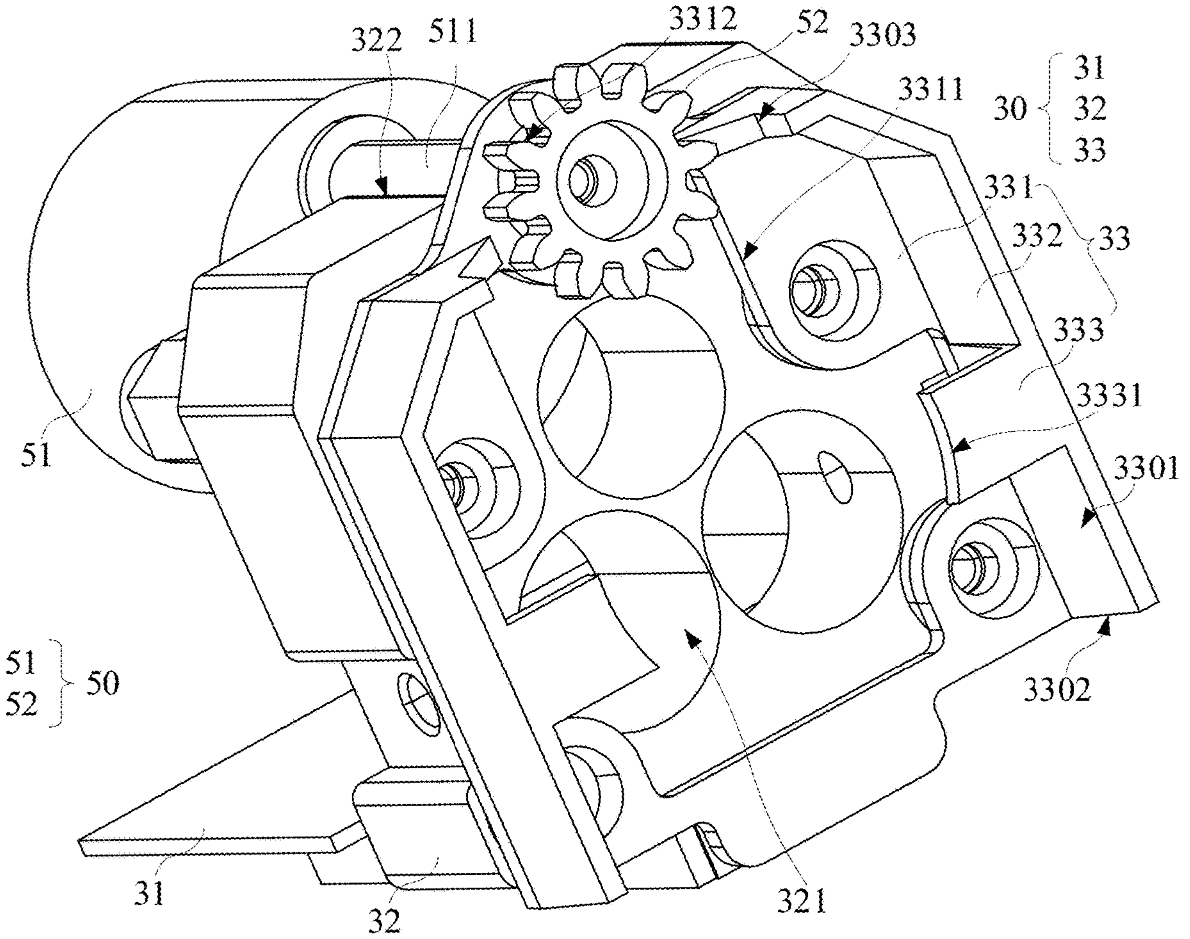
FIG. 8 is a structural schematic view of a part of the projection assembly shown in FIG. 2 according to some embodiments of the disclosure.

As shown in FIGS. 6 and 7 and 8, FIG. 6 is a structural schematic view of a part of the projection assembly 103 shown in FIG. 2 according to some embodiments of the disclosure, FIG. 7 is a structural schematic view of a part of the projection assembly 103 shown in FIG. 2 according to some embodiments of the disclosure, and FIG. 8 is a structural schematic view of a part of the projection assembly 103 shown in FIG. 2 according to some embodiments of the disclosure. The mounting bracket 30 may include a mounting base 31 fixed to the mounting housing 102, such as the housing body 10, a support base 32 arranged on the mounting base 31, and a limit base 33 arranged on a side of the support base 32 close to the housing cover 20.

The mounting base 31 may be fixed to the housing body 10, such as the mounting plate 12, through inserting, welding, screwing, or snapping. In some embodiments, the mounting base 31 may be omitted. In some embodiments, the mounting base 31 is arranged adjacent to the insert hole 121. In some embodiments, the mounting base 31 may be made of a thermally conductive material for heat dissipation. In some embodiments, the mounting base 31 may be a thermally conductive metal. In some embodiments, the mounting base 31 may be called a "heat dissipation member". In some embodiments, the mounting base 31 may be of a plate-shaped structure to improve heat dissipation.

The support base 32 may be fixed to the mounting base 31 through inserting, welding, screwing, or snapping. In some embodiments, the support base 32 may be integrated with the mounting base 31 to form a one-piece structure. In some embodiments, the support base 32 may be arranged on a side of the mounting base 31 away from the mounting plate 12. In some embodiments, the support base 32 may be arranged on a side of the mounting base 31 close to the housing cover 20. In some embodiments, the support base 32 may be arranged adjacent to the insert hole 121. In some embodiments, the support base 32 may be fixed to the mounting housing 102, such as the housing body 10. In some embodiments, the support base 32 may be directly fixed to the mounting housing 102, such as the housing body 10, instead of being fixed to the mounting base 31. In some embodiments, the support base 32 may be a part of the mounting housing 102, such as a housing body 10. In some embodiments, the support base 32 may divide the mounting space 1001 into a first space 1002 and a second space 1003. The first space 1002 is defined on a side of the support base 32 away from the housing cover 20, and the second space 1003 is defined on a side of the support base 32 close to the housing cover 20, thereby achieving spatial separation and reducing the interaction between the first space 1002 and the second space 1003. In some embodiments, the heat dissipation tube 14 may be arranged in the first space 1002 to dissipate heat of the first space 1002. In some embodiments, the support base 32 may be omitted.

The support base 32 may include a light-transmitting hole 321 extending through the support base 32 to cooperate with the laser module 40. In some embodiments, the number of the light-transmitting holes 321 may be one or more, which may be adjusted based on the laser module 40. In some embodiments, the number of the light-transmitting holes 321 may be three. In some embodiments, the light-transmitting hole 321 may be in communication with the first space 1002 and the second space 1003.

The support 32 includes an avoiding hole 322 extending through the support 32 to cooperate with the drive module 50 and enable the drive module 50 to penetrate the avoiding hole 322. In some embodiments, the avoiding hole 322 is located around the light-transmitting hole 321 to avoid reducing the light-transmitting effect of the light-transmitting hole 321. In some embodiments, a notch may be formed by the avoiding hole 322 when the avoiding hole 322 is arranged at the edge of the support base 32, and the avoiding hole 322 may also be called the "notch". In some embodiments, the avoiding hole 322 may be omitted. In some embodiments, the location of the avoiding hole 322 may be adjusted based on the location of the drive module 50.

The limit base 33 may be fixed to the support base 32 through inserting, welding, screwing, or snapping. In some embodiments, the limit base 33 may be integrated with the support base 32 to form a one-piece structure. In some embodiments, the limit base 33 may be arranged on a side of the support base 32 close to the housing cover 20. In some embodiments, when the support base 32 is omitted, the limit base 33 may be arranged on the mounting base 31 or on the mounting housing 102, such as the housing body 10.

The limit base 33 may be arranged facing the insert hole 121. The limit base 33 has a limit space 3301 to accommodate the grating-sheet insert module 60. The limit base 33 defines an avoiding opening 3302 at a position facing the insert hole 121, so that the insert hole 121 is in communication with the limit space 3301 through the avoiding opening 3302, and is configured to cooperate with the limit space 3301 to mount the grating-sheet insert module 60 and enable the grating-sheet insert module 60 to penetrate the avoiding opening 3302.

The limit base 33 may include a first baffle 331 arranged on the support base 32, a limit side plate 332 arranged on a side of the first baffle 331 close to the housing cover 20, and a second baffle 333 arranged on the limit side plate 332 and facing the first baffle 331. The first baffle 331, the limit side plate 332, and the second baffle 333 are connected to each other to cooperatively form the limit space 3301, and the avoiding opening 3302 is defined on the limit side plate 332. The first baffle 331, the limit side plate 332, and the second baffle 333 cooperate with each other to accommodate the grating-sheet insert module 60.

The first baffle 331 may be fixed to the side of the support base 32 close to the housing cover 20 through inserting, welding, screwing, or snapping. In some embodiments, the first baffle 331 may not be fixed to the support base 32. In some embodiments, the support base 32 may be configured to replace the first baffle 331, so that the first baffle 331 may be omitted, and the support base 32, the limit side plate 332, and the second baffle 333 may be connected to each other to cooperatively form the limit space 3301. In some embodiments, the first baffle 331 may replace the support base 32, so that the first baffle 331 may be arranged according to the structure of the support base 32 and the relationship between the support base 32 and other structures, and the first baffle 331 has the function of the support base 32. In some embodiments, the first baffle 331 includes a first channel 3311 at a position corresponding to the light-transmitting hole 321 to cooperate with the laser module 40, and the first channel 3311 is in communication with the light-transmitting hole 321 and the limit space 3301, respectively. In some embodiments, the first baffle 331 defines a limit hole 3312 defined on a position corresponding to the accommodating hole 322 to cooperate with the drive module 50 and enable the drive module 50 to penetrate the limit hole 3312, and the limit hole 3312 is in communication with the avoiding hole 322. In some embodiments, the limit hole 3312 is located in or out of the limit space 3301.

The limit side plate 332 may be fixed to the first baffle 331 through inserting, welding, screwing, or snapping. In some embodiments, the limit side plate 332 may extend from an edge of the first baffle 331 in a direction towards the housing cover 20. In some embodiments, the limit side plate 332 may be a part of the mounting housing 102, such as the housing body 10. In some embodiments, the limit side plate 332 may be integrated with the first baffle 331 to form a one-piece structure.

In some embodiments, the limit side plate 332 may define the avoiding opening 3302. In some embodiments, the limit side plate 332 defines an avoiding channel 3303 adjacent to the limit hole 3312 to cooperate with the drive module 50 and enable the drive module 50 to penetrate the avoiding channel 3303.

In some embodiments, the mounting housing 102, such as the housing body 10, may have a function of the limit side plate 332 to cooperate with the grating-sheet insert module 60, so that the mounting housing 102, such as the housing body 10, may replace the limit side plate 332, and the limit side plate 332 may be omitted.

The second baffle 333 may be fixed to the limit side plate 332 through inserting, welding, screwing, or snapping. In some embodiments, the second baffle 333 may be a part of the mounting housing 102, such as the housing body 10. In some embodiments, the second baffle 333 may be integrated with the limit side plate 332 to form a one-piece structure.

The second baffle 333 may define a second channel 3331 extending through the second baffle 333 at a position corresponding to the first channel 3311 to cooperate with the laser module 40, and the second channel 3331 is in communication with the limit space 3301. In some embodiments, the first channel 3311, the second channel 3331, and the limit space 3301 may be defined in the transmission path.

In some embodiments, the second baffle 333 may be arranged on the mounting housing 102, such as the housing body 10, instead of the limit side plate 332.

Figure 9:
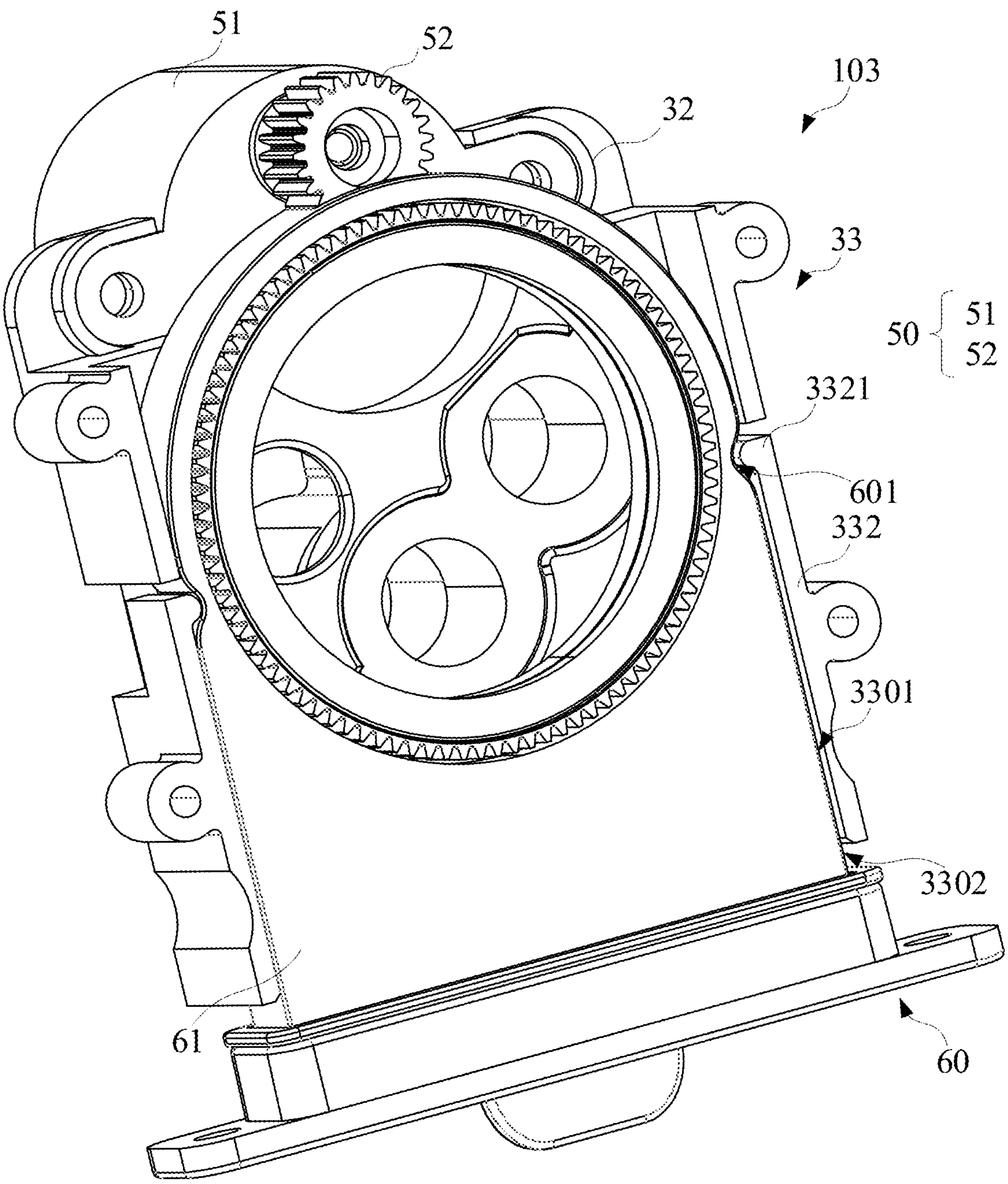
FIG. 9 is a structural schematic view of a part of the projection assembly shown in FIG. 6 according to some embodiments of the disclosure.

As shown in FIG. 9, FIG. 9 is a structural schematic view of a part of the projection assembly 103 shown in FIG. 6 according to some embodiments of the disclosure. The limit side plate 332 may include an elastic buckle 3321 extending into the limit space 3301 to be snapped or engaged with the grating-sheet insert module 60 and configured to limit the location of the grating-sheet insert module 60. In some embodiments, when the grating-sheet insert module 60 is inserted into the limit space 3301 from the avoiding opening 3302, the grating-sheet insert module 60 slides in the limit space 3301 and slides to the location where the grating-sheet insert module 60 abuts against the elastic buckle 3321; when the grating-sheet insert module 60 continues to slide, the elastic buckle 3321 bends in a direction of outside of the limit space 3301 and deforms elastically; when the grating-sheet insert module 60 continues to slide to a location where the grating-sheet insert module 60 is snapped with the elastic buckle 3321, and the location of the grating-sheet insert module 60 is limited by the elastic buckle 3321.

As shown in FIG. 6, the laser module 40 may be configured to emit light, such as laser light, or may emit light with a color, such as red light, blue light, or green light, etc., based on a color requirement. The laser module 40 may be fixed to the mounting bracket 30, such as the mounting base 31, through inserting, welding, screwing or snapping, or may be fixed to other structures of the mounting bracket 30, such as the support base 32 or the limit base 33, or may be fixed to the mounting housing 102, such as the housing body 10. The laser module 40 may be arranged corresponding to the light-transmitting hole 321, so that the light emitted by the laser module 40 may transmit through the light-transmitting hole 321, the first channel 3311, the limit space 3301, the second channel 3331, and the light outlet 2002 successively in the transmission path, and be emitted out. In some embodiments, the laser module 40 may be arranged on a side of the mounting base 31 away from the housing cover 20. In some embodiments, the laser module 40 may arranged in the first space 1002. In some embodiments, the laser module 40 may include a red light laser, a green light laser, a blue light laser, and the like. In some embodiments, laser module 40 may include three lasers corresponding to three light-transmitting holes 321, respectively, so that light emitted by each laser transmits through the corresponding light-transmitting hole 321. In some embodiments, the three lasers include a red light laser, a green light laser, and a blue light laser, respectively.

Figure 10:
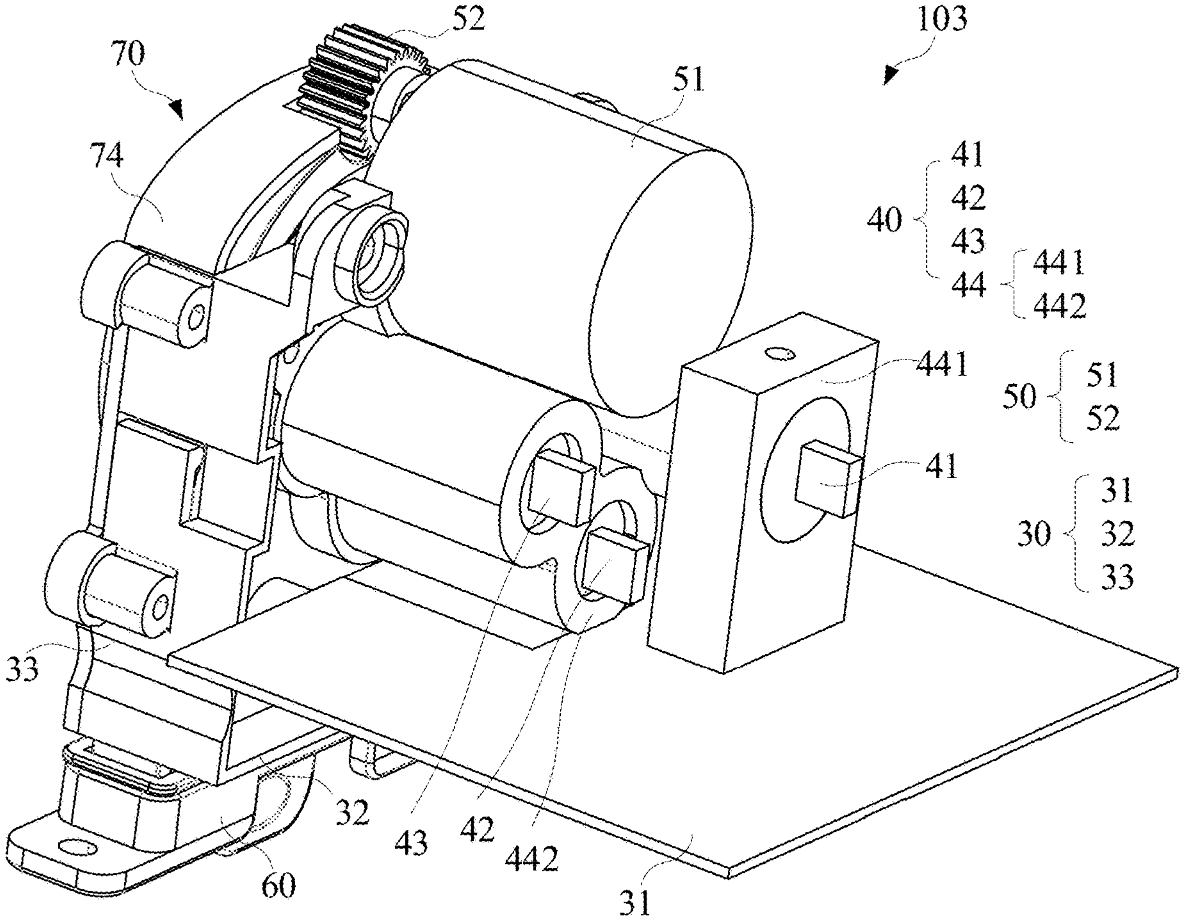
FIG. 10 is a structural schematic view of a part of the projection assembly shown in FIG. 9 according to some embodiments of the disclosure.

As shown FIG. 10, FIG. 10 is a structural schematic view of a part of the projection assembly 103 shown in FIG. 9 according to some embodiments of the disclosure. The laser module 40 may include three lasers (such as a first laser 41, a second laser 42, a third laser 43) and a heat dissipation member 44. The heat dissipation member 44 may dissipate heat of the three lasers, such as the first laser 41, the second laser 42, and the third laser 43.

The heat dissipation member 44 may be made of a thermally conductive metal material or other material. In some embodiments, the heat dissipation member 44 may include a first heat dissipation sub-member 441 and a second heat dissipation sub-member 442. The first heat dissipation sub-member 441 may be wrapped around a periphery of the first laser 41 to dissipate heat of the first laser 41. The second heat dissipation sub-member 442 may be wrapped around peripheries of the second laser 42 and the third laser 43 to dissipate heat of the second laser 42 and the third laser 43.

In some embodiments, the first heat dissipation sub-member 441 may be fixed to the mounting base 31 and may transfer heat to the mounting base 31. In some embodiments, the second heat dissipation sub-member 442 may be fixed to the mounting base 31 and may transfer heat to the mounting base 31. In some embodiments, the second heat dissipation sub-member 442 may not be fixed to the mounting base 31. In some embodiments, at least one of the first heat dissipation sub-member 441 and the second heat dissipation sub-member 442 may be integrated with the mounting base 31 to form a one-piece structure.

It should be understood that two heat dissipation sub-members may be provided to dissipate heat of the second laser 42 and the third laser 43, respectively.

In some embodiments, the first laser 41 may be a red light laser, a green light laser, or a blue light laser.

As shown in FIGS. 6, 7 and 8, the drive module 50 may include a drive mechanism 51 fixed to the mounting bracket 30, such as the mounting base 31, and a transmission member 52 in transmission connection with the drive mechanism 51 and the grating-sheet insert module 60, respectively. The drive mechanism 51 is configured to drive the grating-sheet insert module 60 through the transmission member 52, and adjust the grating-sheet insert module 60, thereby adjusting the display effect of the laser lamp 100.

The drive mechanism 51 may be fixed to the mounting bracket 30, such as a support base 32, through inserting, welding, screwing, or snapping, or may be fixed to other structures of the mounting bracket 30, such as the mounting base 31 or the limiting base 33, or may be fixed to the mounting housing 102, such as the housing body 10. In some embodiments, the drive mechanism 51 may be arranged on the side of the mounting base 31 away from the housing cover 20. In some embodiments, the drive mechanism 51 may be arranged in the first space 1002. In some embodiments, the drive mechanism 51 may be arranged on a side of the laser module 40 away from the mounting base 31.

The drive mechanism 51 may be an electric motor or other structure such as a hydraulic cylinder or a linear cylinder, etc. The drive mechanism 51 may include a drive shaft 511, and the drive mechanism 51 is in transmission connection with the transmission member 52 through the drive shaft 511. The drive shaft 511 penetrates through the avoiding hole 322 and the limit hole 3312. In some embodiments, the drive shaft 511 may be a part of the transmission member 52, and the drive mechanism 51 is in transmission connection with the transmission member 52, such as the drive shaft 511.

The transmission member 52 may be located on a side of the mounting base 31 close to the housing cover 20 and may be in transmission connection with the drive shaft 511. In some embodiments, the transmission member 52 may located in the second space 1003. In some embodiments, the transmission member 52 may be located on a side of the first baffle 331 close to the housing cover 20, and may partially extend into the limit space 3301 through the avoiding channel 3303 to cooperate with and be in transmission connection with the grating-sheet insert module 60. In some embodiments, the transmission member 52 may be totally located in the limit space 3301 and cooperate with and be in transmission connection with the grating-sheet insert module 60.

The transmission member 52 may be a gear or roller, and may be coaxially connected and fixed to the drive shaft 511. In some embodiments, the transmission member 52 may be rotatably connected to the limit base 33, such as the first baffle 331, and in transmission connection with the drive shaft 511. In some embodiments, the transmission member 52 may be located in the limit space 3301. In some embodiments, the drive shaft 511 may be a part of the transmission member 52, the drive shaft 511 of the transmission member 52 successively penetrates through the limit hole 3312 and the avoiding hole 322 and is in transmission connection with the drive mechanism 51.

The grating-sheet insert module 60 may be configured to insert into the housing body 10, such as the mounting space 1001, through the insert hole 121 of the housing body 10 from outside of the mounting housing 102, and may be configured to insert into the limit base 33, such as the limit space 3301, through the avoiding opening 3302 of the limit base 33, so as to be in contact and cooperate with the drive module 50, such as the transmission member 52.

Figure 11:
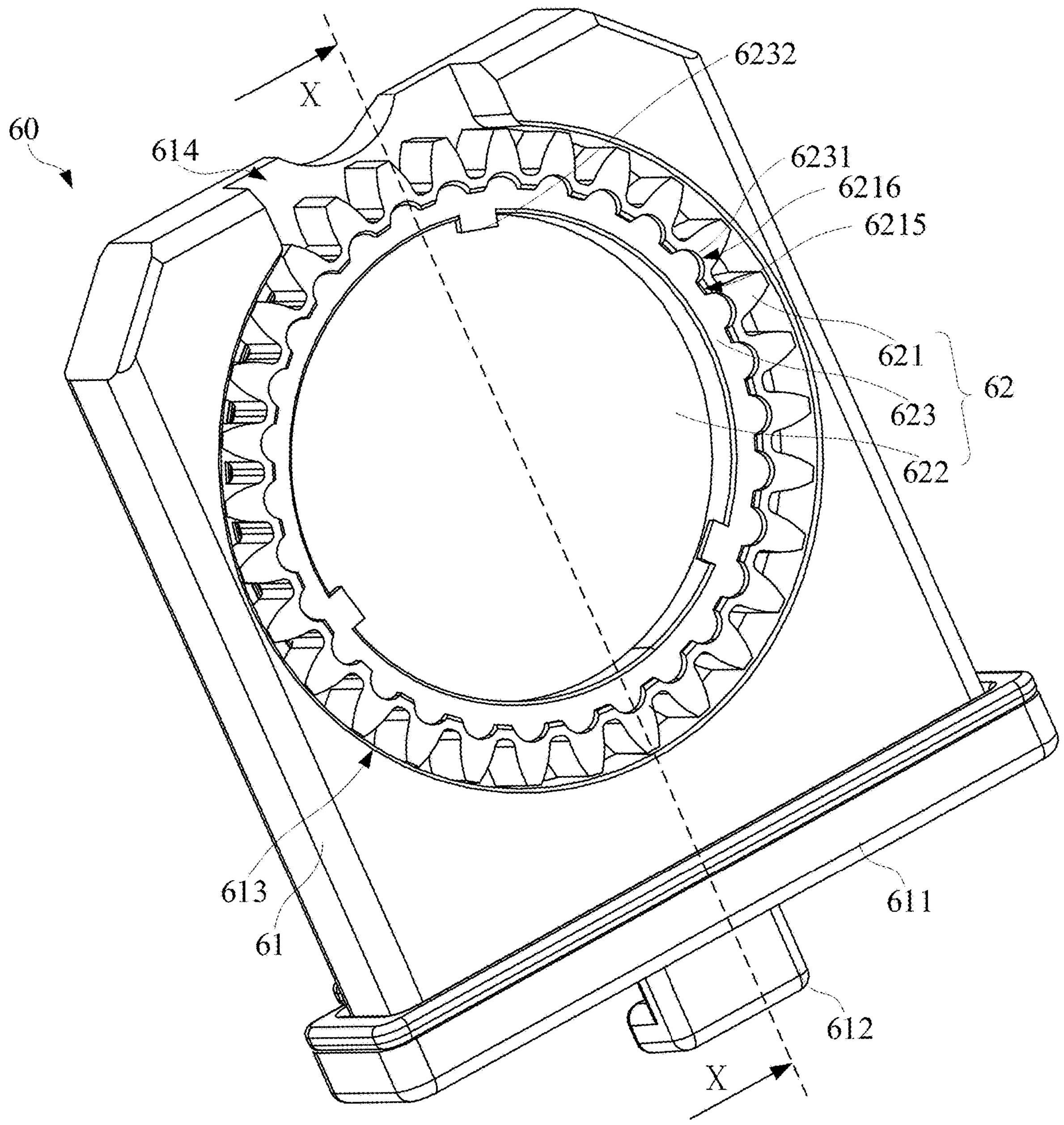
FIG. 11 is a structural schematic view of a grating-sheet insert module shown in FIG. 6.
Figure 12:
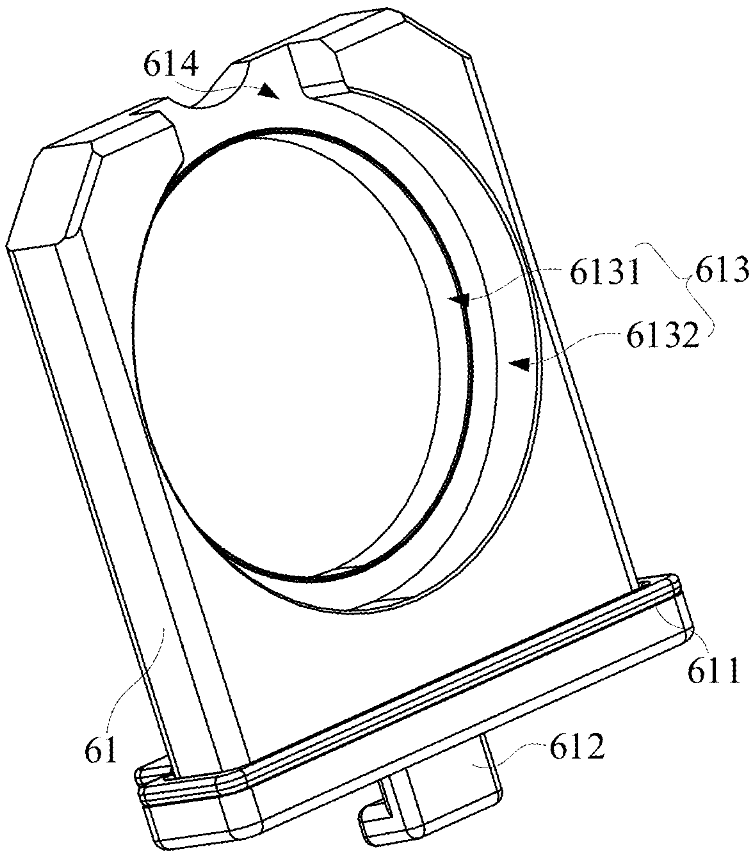
FIG. 12 is a structural schematic view of an insert tongue shown in FIG. 11 according to some embodiments of the disclosure.

As shown in FIGS. 6 and 11, FIG. 11 is a structural schematic view of the grating-sheet insert module 60 shown in FIG. 6. The grating-sheet insert module 60 may include an insert tongue 61 inserted into the limit base 33, such as the limit space 3301, and a grating insert 62 arranged on the insert tongue 61. In the limit base 33, such as the limit space 3301, the grating insert 62 is detachably arranged on the insert tongue 61 and is in contact with the drive module 50, such as the transmission member 52, so that the grating insert 62 is rotatable around a shaft axis of a shaft, and the shaft axis may extend in the transmission path. The light emitted by the laser module 40 may transmit through the grating insert 62. When the grating insert 62 rotates, the light is adjusted by the grating insert 62, thereby adjusting the display effect of the laser lamp 100.

Figure 13:
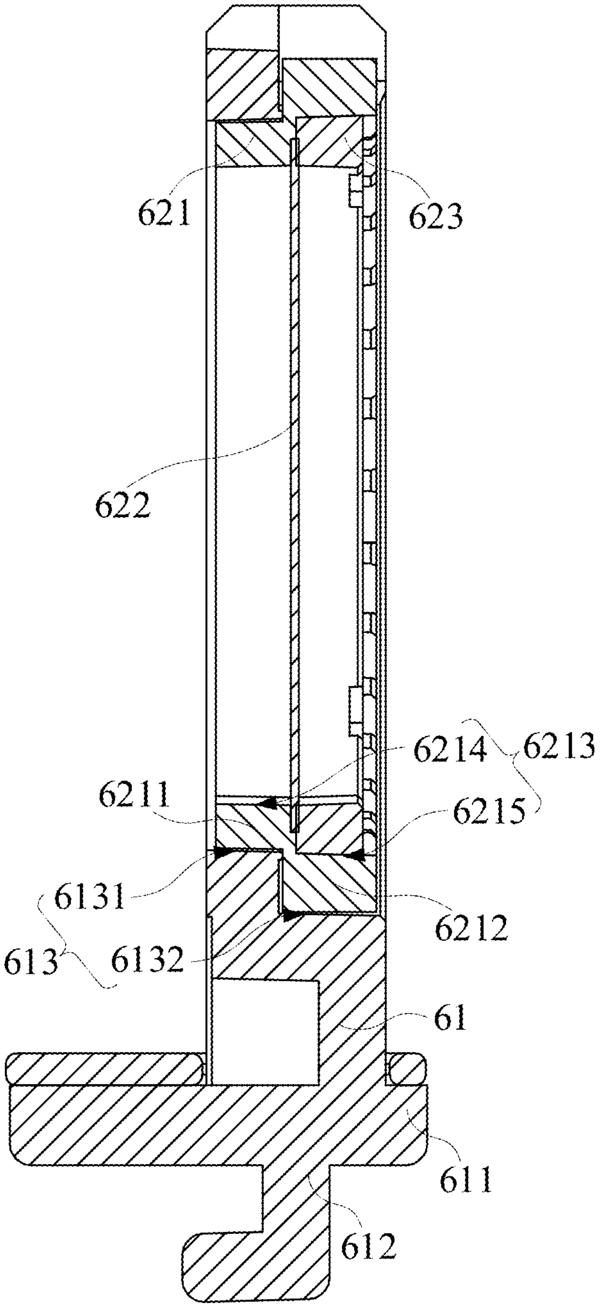
FIG. 13 is a cross-sectional structural schematic view of the grating-sheet insert module along X-X direction shown in FIG. 11.

As shown in FIGS. 6, 11, 12 and 13, FIG. 12 is a structural schematic view of the insert tongue 61 shown in FIG. 11 according to some embodiments of the disclosure, and FIG. 13 is a cross-sectional structural schematic view of the grating-sheet insert module 60 along X-X direction shown in FIG. 11. The insert tongue 61 may be a plate-shaped structure, a frame structure, or other structure, which is not limited herein. The insert tongue 61 includes a snapping portion 611 at a position corresponding to the insert hole 121, the snapping portion 611 is configured to seal the insert hole 121 when the insert tongue 61 is inserted into the limit base 33, such as the limit space 3301, thereby sealing the mounting housing 102, such as the mounting space 1001. The snapping portion 611 may be further configured to fix the insert tongue 61. In some embodiments, the snapping portion 611 may be detachably connected to the housing body 10, such as the mounting plate 12, through clamping, screwing, or the like, so as to achieve the disassembly and separation, and assembly of the insert tongue 61 and the mounting housing 102. In some embodiments, the snapping portion 611 may be directly fixed to the housing body 10, such as the mounting plate 12, by welding, bonding, or the like. In some embodiments, the snapping portion 611 may be omitted, and the insert tongue 61 may be directly fixed to the mounting housing 102, such as the mounting space 1001, and may be located in the limit base 33, such as the limit space 3301. In some embodiments, when the insert tongue 61 has the function of limiting a location of the grating insert 62, the limit base 33 may be omitted.

In some embodiments, the snapping portion 611 may be flush with the outer surface of the mounting plate 12 at the insert hole 121 to improve appearance. In some embodiments, the snapping portion 611 may include a handle 612 for ease of user holding. The handle 612 may be located outside the mounting housing 102, such as the mounting space 1001, when the insert tongue 61 is inserted into the limit base 33, such as the limit space 3301. In some embodiments, the handle 612 may be omitted.

The insert tongue 61 may define a mounting hole 613 extending through the insert tongue 61 in the transmission path, and the mounting hole 613 is configured to mount the grating insert 62, so that the light emitted by the laser module 40 may enter the mounting hole 613 in the transmission path and transmit through the grating insert 62. In some embodiments, the mounting hole 613 may be a step hole and may define a first step hole 6131 and a second step hole 6132 which are coaxial with each other. A diameter of the first step hole 6131 may be smaller or less than the that of the second step hole 6132. In some embodiments, the first step hole 6131 and the second step hole 6132 are connected to each other.

In some embodiments, the first step hole 6131 is located closer to the laser module 40 than the second step hole 6132. In some embodiments, the second step hole 6132 is located closer to the laser module 40 than the first step hole 6131.

In some embodiments, the insert tongue 61 may define an avoiding groove 614 at a position corresponding to the transmission member 52. The avoiding groove 614 may extend to an edge of the insert tongue 61 to form a notch and may be in communication with the mounting hole 613, such as the second step hole 6132, so that the transmission member 52 may extend into the mounting hole 613 through the avoiding channel 3303 and the avoiding groove 614 to be in transmission connection with the grating insert 62. In some embodiments, the avoiding groove 614 may be a through groove and extend through the insert tongue 61 in the transmission path. In some embodiments, the avoiding groove 614 may be in communication with the first step hole 6131.

In some embodiments, the insert tongue 61 may slide into or out of the mounting space 1001 from the insert hole 121. In addition, the position of the avoiding groove 614 is arranged in such a way that the insert tongue 61 may slide to a location where the drive module 50, such as the transmission member 52, is located in the avoiding groove 614 when the insert tongue 61 slides into the mounting space 1001, and that the insert tongue 61 may slide to a location where the drive module 50, such as the transmission member 52, is located out of the avoiding groove 614 when the insert tongue 61 slides out of the mounting space 100.

As shown in FIG. 9, an engaging groove 601 is defined on the insert tongue 61 to cooperate or engage with the elastic buckle 3321 to limit the position of the grating-sheet insert module 60, such as the insert tongue 61. In some embodiments, when the grating-sheet insert module 60, such as the insert tongue 61, is inserted into the limit space 3301 from the avoiding opening 3302, the grating-sheet insert module 60 slides in the limit space 3301 and slides to the location where the grating-sheet insert module 60 abuts against the elastic buckle 3321. When the grating-sheet insert module 60 continues to slide, the elastic buckle 3321 bends in a direction of outside of the limit space 3301 and deforms elastically. When the grating-sheet insert module 60 continues to slide to enable the elastic buckle 3321 to rebound and enter the engaging groove 3321, the grating-sheet insert module 60 is engaged with the elastic buckle 3321, and the location of the grating-sheet insert module 60, such as the insert tongue 61, is limited by the elastic buckle 3321.

As shown in FIGS. 6, 11, and 13, the grating insert 62 may include a carrier 621 arranged in the mounting hole 613 and in contact and cooperating with and in transmission connection with the drive module 50, such as a transmission member 52, a grating sheet 622 arranged on the carrier 621, and a clamping member 623 cooperating with the carrier 621 to clamp and fix the grating sheet 622. The carrier 621 is configured to cooperate with the clamping member 623 to clamp the grating sheet 622, so that the grating insert 62 is modularized as a whole. The clamping member 623 may fix the grating sheet 622 to the carrier 621. The carrier 621 is configured to rotate around the shaft axis in the mounting hole 613, thereby causing the grating insert 62, such as the grating sheet 622, to rotate. The grating sheet 622 has different portions or multiple same portions, each of the portions may be patterned. In some embodiments, the grating sheet 622 may not be divided into multiple portions, and may be integrally patterned. Even the grating sheet 622 may be configured based on the requirements of those skilled in the art for the display effect of the laser lamp 100, which is not limited. The light emitted by the laser module 40 may transmit through the grating sheet 622, that is, the light emitted by the laser module 40 may be transmitted into the mounting hole 613 in the transmission path and transmitted through the grating sheet 622. The carrier 621 is in contact with the drive module 50, such as the transmission member 52, so as to achieve transmission connection between the carrier 621 and the drive module 50, such as the transmission member 52. With the drive of the drive module 50, such as the transmission member 52, the carrier 621 may rotate around the shaft axis, and the grating insert 62, such as the grating sheet 622, may rotate. A light-transmitting portion of the grating sheet 622 changes with the rotation of the grating insert 62, such as the grating sheet 622, thereby achieving the function of adjusting the display effect of the laser lamp 100.

In some embodiments, the shaft axis may coincide with the central axis of the mounting hole 613.

An overall shape of the carrier 621 may be annular, columnar, or the like, which is not limited. The carrier 621 may include a carrier body 6211 arranged in the mounting hole 613 and configured to mount the grating sheet 622, and a carrier flange 6212 arranged on the carrier body 6211 and located in the second step hole 6132.

The carrier body 6211 may be located in the mounting hole 613 and may be rotatable around the shaft axis in the mounting hole 613. In some embodiments, the carrier body 6211 may extend in the extension direction of the mounting hole 613, and may be arranged in the first step hole 6131 or the second step hole 6132.

In some embodiments, the carrier body 6211 may have a cylindrical surface, and an outer diameter of the cylindrical surface of the carrier body 6211 may be the same as an inner diameter of the mounting hole 613, such as the first step hole 6131, so that the carrier body 6211 may be arranged in the mounting hole 613, such as the first step hole 6131, and rotatable in the mounting hole 63, thus, wobble of the carrier body 6211 in the mounting hole 613, such as the first step hole 6131 may be reduced. In some embodiments, the outer diameter of the cylindrical surface of the carrier body 6211 may be unequal to the inner diameter of the mounting hole 613, such as the first step hole 6131. In some embodiments, the carrier body 6211 may be other structure, such as a frame structure or an irregular structure, and may be arranged in the mounting hole 613, such as a first step hole 6131, in contact with the hole wall of the mounting hole 613, such as the first step hole 6131 to achieve stable rotation of the carrier body 6211.

The carrier body 6211 may include a carrier hole 6213 extending through the carrier body 6211 in the transmission path, and the carrier hole 6213 is configured to mount the grating sheet 622, so that the light emitted by the laser module 40 enters the carrier hole 6213 in the transmission path and transmits through the grating sheet 622.

In some embodiments, the carrier hole 6213 may be a step hole and may include a third step hole 6214 and a fourth step hole 6215 which are coaxial with each other. A diameter of the third step hole 6214 may be smaller or less than a diameter of the fourth step hole 6215. In some embodiments, the third step hole 6214 and the fourth step hole 6215 are in communication with each other.

In some embodiments, the third step hole 6214 is located closer to the laser module 40 than the fourth step hole 6215. In some embodiments, the fourth step hole 6215 is located closer to the laser module 40 than the third step hole 6214.

In some embodiments, an engaging slot 6216 is defined on a hole wall of the fourth step hole 6215 to cooperate or engage with the clamping member 623.

The carrier flange 6212 may be located in the second step hole 6132 and arranged around a periphery of the carrier body 6211. A surface of the carrier flange 6212 facing the first step hole 6131 may abut against the insert tongue 61, so that the carrier flange 6212 cannot slide into the first step hole 6131, and the carrier 621 is engaged into the mounting hole 613 of the insert tongue 61. In some embodiments, a surface of the carrier flange 6212 away from the first step hole 6131 may abut against the limit base 33, such as the first baffle 331 or the second baffle 333, so that the bearing side 6212 cannot slide out of the second step hole 6132, and the carrier 621 is engaged in the mounting hole 613 of the insert tongue 61. In some embodiments, the carrier flange 6212 may be magnetically connected to the insert tongue 61, so that the carrier 621 is rotatable and limited in the mounting hole 613. For example, a pair of magnets are respectively arranged on an outer edge of the carrier flange 6212 and the hole wall of the mounting hole 613, such as the second step hole 6132, so that the magnetic connection between the carrier flange 6212 and the insert tongue 61 is achieved through the pair of magnets. In some embodiments, the pair of magnets may be respectively arranged on the carrier body 6211 and the hole wall of the mounting hole 613, such as the first step hole 6131, so that the magnetic connection between the carrier body 6211 and the insert tongue 61 is achieved, and the carrier 621 is rotatable and limited in the mounting hole 613.

In some embodiments, the carrier flange 6212 may have a cylindrical surface, and the outer diameter of the cylindrical surface of the carrier flange 6212 may be the same as the inner diameter of the mounting hole 613, such as the second step hole 6132, so that the carrier flange 6212 is capable of being arranged in the mounting hole 613, such as the second step hole 6132, and rotatable in the mounting hole 613, and wobble of the carrier flange 6212 in the mounting hole 613, such as the second step hole 6132 may be reduced. In some embodiments, the outer diameter of the cylindrical surface of the carrier flange 6212 may unequal to the inner diameter of the mounting hole 613, such as the second step hole 6132. In some embodiments, the carrier flange 6212 may be a frame structure, an irregular structure, or other structure, and may be arranged in the mounting hole 613, such as the second step hole 6132, in contact with the hole wall of the mounting hole 613, such as the second step hole 6132 to achieve stable rotation of the carrier flange 6212.

The cylindrical surface of the carrier flange 6212 may be in contact with and cooperate with the transmission member 52, such as a roller, so that when the transmission member 52 rotates, the transmission member 52, such as the roller, drives the carrier flange 6212 to rotate, and further drives the carrier 621 to rotate.

The carrier flange 6212 may include teeth, and the teeth are engaged with teeth of the transmission member 52, such as a gear, so that when the transmission member 52, such as the gear, rotates, the transmission member 52 drives the carrier flange 6212 to rotate, and further drives the carrier 621 to rotate.

In some embodiments, the inner diameter of the fourth step hole 6215 may be enlarged and defined on the carrier flange 6212. In some embodiments, a side of the fourth step hole 6215 extends in a direction towards the third step hole 6214 and further extends to a portion of the carrier body 6211 where the carrier flange 6212 is not located. In some embodiments, the fourth step hole 6215 may extend in a direction from the second step hole 6132 to the first step hole 6131 and further extend into the first step hole 6131, so that the third step hole 6214 is located in the first step hole 6131. In other words, a part of the fourth step hole 6215 and the third step hole 6214 may be both located in the in the first step hole 6131. In some embodiments, the third step hole 6214 may extend in a direction from the first step hole 6131 to the second step hole 6132 and further extend into the second step hole 6132, so that the third step hole 6214 is located in the second step hole 6132. In other words, a part of the third step hole 6214 and the fourth step hole 6215 may be both located in the in the second step hole 6132. In some embodiments, a side of the fourth step hole 6215 away from the third step hole 6214 may be shortened, so that the third step hole 6214 may extend to a portion of the carrier body 6211 where the carrier flange 6212 is located. In some embodiments, the third step hole 6214 may extend in a direction from the first step hole 6131 to the second step hole 6132 and further extend into the second step hole 6132, so that the fourth step hole 6215 is located in the second step hole 6132. In other words, a part of the third step hole 6214 and the fourth step hole 6215 may be both located in the in the second step hole 6132. In some embodiments, the third step hole 6214 may extend in a direction from the second step hole 6132 to the first step hole 6131 and further extend into the first step hole 6131, so that the fourth step hole 6215 is located in the first step hole 6131. In other words, a part of the third step hole 6214 and the fourth step hole 6215 may be both located in the in the first step hole 6131.

The grating sheet 622 may be located in the carrier hole 6213, such as the fourth step hole 6215. A surface of the grating sheet 622 facing the third step hole 6214 may abut against the carrier 621, such as the carrier body 6211, so that the grating sheet 622 cannot slide into the third step hole 6214, and the grating sheet 622 is clamped into the carrier 621, such as the carrier hole 6213 of the carrier body 6211. In some embodiments, a surface of the grating sheet 622 away from the third step hole 6214 may abut against the clamping member 623, so that the grating sheet 622 cannot slide out of the fourth step hole 6215. In some embodiments, the grating sheet 622 may be detachably arranged in the carrier hole 6213 through other means. In some embodiments, the grating sheet 622 may be detachably arranged in the third step hole 6214 through other means.

The clamping member 623 may be located in the carrier hole 6213, such as the fourth step hole 6215, to cooperate with the carrier 621 to clamp the grating sheet 622. The clamping member 623 may be an annular structure, so that the light transmitting through the grating sheet 622 transmits through the clamping member 623. The clamping member 623 may be fixed to the carrier 621 through detachable connection, such as clamping, screwing, or magnetic connection, or may be directly fixed to the carrier 621 through welding, or bonding, etc. In some embodiments, a pair of magnets are respectively arranged on the clamping member 623 and the hole wall of the carrier hole 6213, such as the hole wall of the fourth step hole 6215, so that the magnetic connection between the clamping member 623 and the carrier 621 may be achieved through the pair of magnets. In some embodiments, the clamping member 623 may be of other structure instead of the annular construction.

In some embodiments, an engaging block 6231 may be arranged on the clamping member 623. When the clamping member 623 is located in the fourth step hole 6215, the engaging block 6231 may be located in the engaging slot 6216, and the clamping member 623 is engaged with and fixed to the carrier 621, such as the carrier body 6211.

In some embodiments, a holding portion 6232 is arranged on the clamping member 623 to facilitate user holding. In some embodiments, the holding portion 6232 is located in the ring of the clamping member 623.

It should be understood that the carrier 621 and the clamping member 623 are configured to clamp and fix the grating sheet 622. In some embodiments, the carrier hole 6213 on the carrier 621 may be omitted, the carrier 621 may be made of a light-transmitting material to enable the light emitted by the laser module 40 to transmit through the carrier 621, and the clamping member 623 may be made of the light-transmitting material to enable the light emitted by the laser module 40 to transmit through the clamping member 623.

The grating insert 62 or the grating sheet 622 in the grating-sheet insert module 60 may be detachable, so that the grating sheet 622 may be arbitrarily switched according to the user's needs, which is convenient for the user to use.

As shown in FIG. 3, the grating module 70 may be arranged in the transmission path and on a side of the grating-sheet insert module 60 away from the laser module 40, so that the light transmitting through the grating-sheet insert module 60, such as the grating sheet 622, transmits through the grating module 70, thereby improving the display effect of the laser lamp 100 with the cooperation of the grating module 70.

The grating module 70 may include a protective sheet 71, a grating member 72, and a fixing member 73.

The protective sheet 71 may be made of a light-transmitting material. The protective sheet 71 may be arranged on the housing cover 20 and disposed correspondingly to the light outlet 2002 to block and seal the light outlet 2002. In some embodiments, the protective sheet 71 may be arranged in the mounting groove 2001 and snapped or engaged with the engaging wall 22 to limit the position of the protective sheet 71.

In some embodiments, a sealing ring 711 may be arranged around the protective sheet 71, so that the sealing ring 711 may be snapped or engaged with the engaging wall 22 to limit the position of the protective sheet 71. In some embodiments, the sealing ring 711 may be configured to block and seal the light-transmitting hole 2002. In addition, the sealing ring 711 may prevent the protective sheet 71 from being in direct contact with the engaging wall 22.

In some embodiments, the sealing ring 711 may include a snapping wall 7111 extending from a side of the sealing ring 711 in a direction away from the groove bottom 21 of the mounting groove 2001 to cooperate with and be snapped with the grating member 72.

The grating member 72 may be arranged on a side of the protective sheet 71 close to or facing the laser module 40. In some embodiments, the grating member 72 may be arranged in the mounting groove 2001.

The grating member 72 may include a carrier plate 721 and a grating group 722 arranged on the carrier plate 721. The carrier plate 721 may be snapped with the sealing ring 711, such as the snapping wall 7111, to limit the position of the grating member 72. In addition, the sealing ring 711 may prevent the carrier plate 721 from being in direct contact with the engaging wall 22.

The carrier plate 721 may be a plate-shaped structure or other structure configured to shield the light. The carrier plate 721 may define a mounting hole 7201 extending through the carrier plate 721 in the transmission path to mount the grating group 722. The number of the mounting holes 7201 may be equal to the number of the light-transmitting holes 321, and the mounting holes 7201 may correspond to the light-transmitting holes 321 one by one, so that the light transmitting through each of the light-transmitting holes 321 may transmit through a corresponding one of the mounting hole 7201.

The number of grating sub-sheets in the grating group 722 may be equal to the number of the mounting holes 7201, and each of the grating sub-sheets is arranged in a corresponding one of the mounting holes 7201. The light transmitting through the mounting hole 7201 may transmit through the grating group 722, such as the grating sub-sheets, thereby improving the display effect of the laser lamp 100 with cooperation of the grating-sheet insert module 60, such as the grating sheet 622.

It should be understood that when the carrier plate 721 is configured to shield the light, it may be replaced by a coating arranged on the protective sheet 71, so that the grating member 72 may be arranged on the protective sheet 71.

The fixing member 73 may be a sheet-shaped structure or other structure. The fixing member 73 may be arranged on a side of the grating member 72 away from the protective sheet 71 and may be fixedly connected to the housing cover 20, so as to cooperate with the housing cover 20 to clamp the protective sheet 71 and the grating member 72, so that the protective sheet 71 and the grating member 72 are arranged on the housing cover 20.

It should be understood that, in some embodiments, the fixing member 73 may be omitted, and the protective sheet 71 and/or the grating member 72 may be fixed to the housing cover 20 through bonding, welding, snapping, or the like. In some embodiments, the grating member 72 may be arranged on the housing body 10. In some embodiments, the protective sheet 71 may be omitted, and the grating member 72 is arranged corresponding to the light outlet 2002 to block and seal the light outlet 2002.

In some embodiments, the fixing member 73 may define a through hole 7301 extending through the fixing member 73 at a position corresponding to the second channel 3331 in the transmission path, so that the light may transmit through the second channel 3331, the through hole 7301, the mounting hole 7201, and the light outlet 2002 successively.

Figure 14:
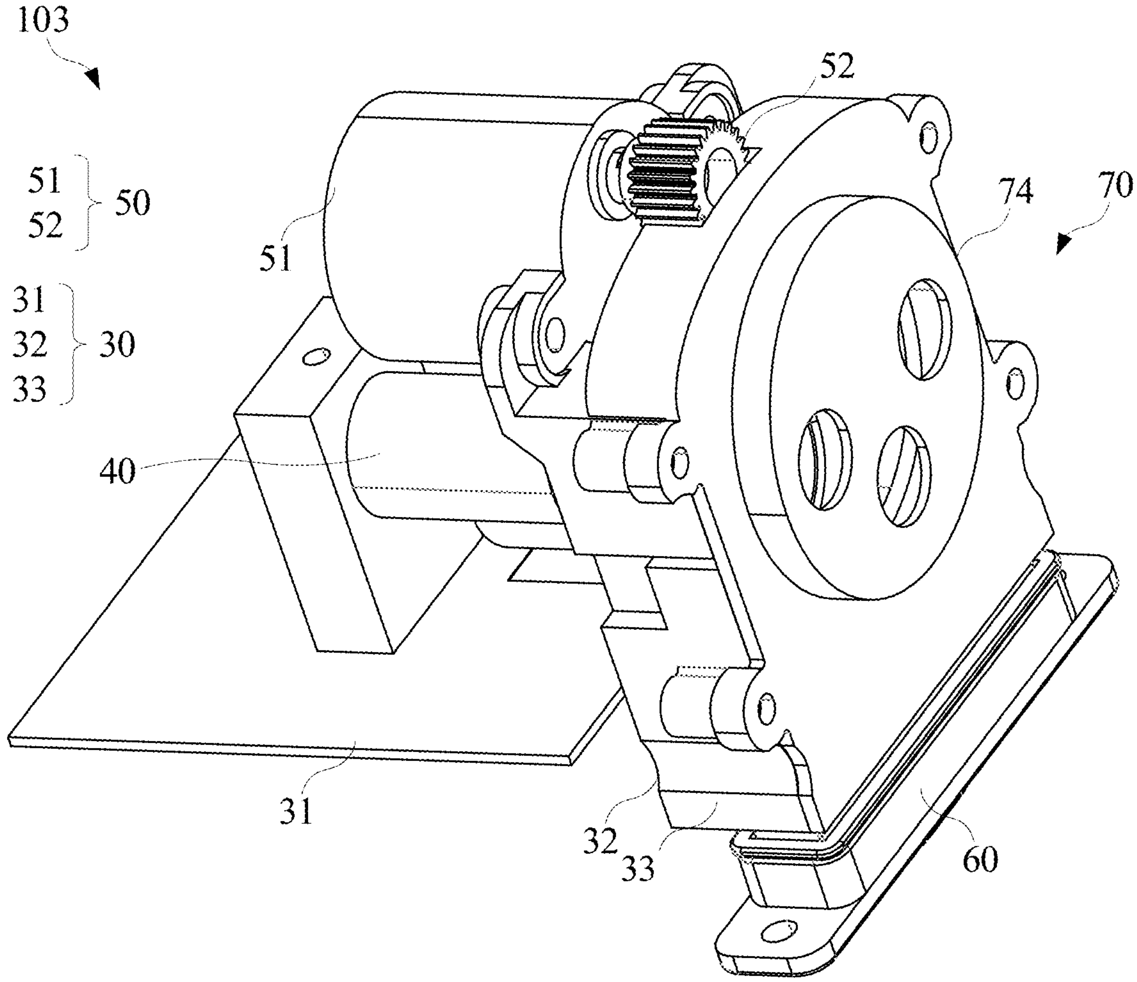
FIG. 14 is a structural schematic view of a part of the projection assembly shown in FIG. 2 according to some embodiments of the disclosure.

As shown in FIG. 14, FIG. 14 is a structural schematic view of a part of the projection assembly 103 shown in FIG. 2 according to some embodiments of the disclosure. The grating module 70 may be fixed to the mounting bracket 30, such as the limit base 33, through fixed connection such as snapping, screwing, welding, or bonding, etc., so that the grating module 70 may not be arranged on the housing cover 20. In some embodiments, the light outlet 2002 in the housing cover 20 of FIG. 5 may be blocked and sealed through a protective sheet made of a light-transmitting material. In some embodiments, the protective sheet 71 may be configured to block and seal the light outlet 2002 on the housing cover 20, and may not be a part of the grating module 70.

In some embodiments, the grating module 70 may include a carrier housing 74 configured to mount or fix other components in the grating module 70, such as the protective sheet 71, the grating member 72, and/or the fixing member 73, etc.

In some embodiments, the carrier housing 74 may be fixedly connected to the limit base 33 to form the limit space 3301. In some embodiments, the carrier housing 74 may be configured as a part of the mounting bracket 30, such as the limit base 33, instead of a part of the grating module 70. In some embodiments, the carrier housing 74 may be fixed to the limit side plate 332 and/or the second baffle 333. In some embodiments, the carrier housing 74 and the second baffle 333 may be a one-piece structure. In some embodiments, the carrier housing 74 may have functions of the second baffle 333, and thus the second baffle 333 may be omitted.

It should be understood that the laser lamp 100 may include a controller (not shown), and the controller may be electrically connected to the projection assembly 103 to control the projection assembly 103. In some embodiments, the controller may be arranged in the mounting housing 102, such as the mounting space 1001. In some embodiments, the controller may be arranged on the mounting base 31. In some embodiments, the controller may be arranged on a side of the mounting base 31 away from the support base 32.

The above is only some embodiments of the present disclosure, but is not to limit the scope of the present disclosure. The equivalent structure or equivalent process transformation made by using the description and the drawings of the present disclosure, or directly or indirectly applying the description and the drawings of the present disclosure to other relevant technical fields, are included in the scope of the present disclosure.

What is claimed is:

1. A grating-sheet insert module, comprising:

an insert tongue, defining a mounting hole extending through the insert tongue and an avoiding groove in communication with the mounting hole, the avoiding groove extending to an edge of the insert tongue; and a grating insert, arranged in the mounting hole, in contact with a hole wall of the mounting hole, configured to be rotatable around a central axis of the mounting hole, the grating insert comprising a grating sheet configured to enable light entering the mounting hole to transmit therethrough;

wherein the grating insert comprises:

a carrier, arranged in the mounting hole, in contact with the hole wall of the mounting hole, and rotatable around the central axis of the mounting hole; and a clamping member, arranged on the carrier and configured to cooperate with the carrier to clamp the grating sheet;

wherein an engaging block is arranged on the clamping member, an engaging slot is defined on the carrier, and the engaging block is engaged with and fixed to the engaging slot.

2. The grating-sheet insert module as claimed in claim 1, wherein the mounting hole comprises a first step hole and a second step hole which are coaxial with each other and in communication with each other, the carrier is arranged in the first step hole and the second step hole, a diameter of the first step hole is smaller than a diameter of the second step hole, a portion of the carrier is located in the second step hole, and a surface of the portion of the carrier located in the second step hole close to the first step hole abuts against the insert tongue.

3. The grating-sheet insert module as claimed in claim 2, wherein the avoiding groove is in communication with the second step hole, the carrier is arranged in the second step hole, and teeth are arranged on a surface of the carrier facing a hole wall of the second step hole.

4. The grating-sheet insert module as claimed in claim 1, wherein the carrier defines a carrier hole extending through the carrier and configured to transmit the light, the grating sheet and the clamping member are arranged in the carrier hole.

5. The grating-sheet insert module as claimed in claim 4, wherein the carrier hole comprises a third step hole and a fourth step hole in communication with each other, a diameter of the third step hole is smaller than a diameter of the fourth step hole, the grating sheet and the clamping member are arranged in the fourth step hole, the grating sheet is arranged closer to the third step hole than the clamping member, the clamping member is configured to cooperate with the carrier to enable a surface of the grating sheet close to the third step hole to abut against the carrier.

6. The grating-sheet insert module as claimed in claim 1, wherein the grating insert is detachably arranged on the insert tongue.

7. A laser lamp, comprising:

a grating-sheet insert module, comprising:

an insert tongue, defining a mounting hole extending through the insert tongue and an avoiding groove in communication with the mounting hole, the avoiding groove extending to an edge of the insert tongue; and a grating insert, arranged in the mounting hole, in contact with a hole wall of the mounting hole, configured to be rotatable around a central axis of the mounting hole, the grating insert comprising a grating sheet configured to enable light entering the mounting hole to transmit therethrough;

a laser module, configured to emit the light; and a drive module, partially arranged in the avoiding groove, in transmission connection with a portion of the grating insert located in the mounting hole, and configured to drive the grating insert to rotate around the central axis of the mounting hole;

wherein the grating insert comprises:

a carrier, arranged in the mounting hole, in contact with the hole wall of the mounting hole, and rotatable around the central axis of the mounting hole; and a clamping member, arranged on the carrier and configured to cooperate with the carrier to clamp the grating sheet;

wherein an engaging block is arranged on the clamping member, an engaging slot is defined on the carrier, and the engaging block is engaged with and fixed to the engaging slot.

8. The laser lamp as claimed in claim 7, wherein the mounting hole comprises a first step hole and a second step hole which are coaxial with each other and in communication with each other, the carrier is arranged in the first step hole and the second step hole, a diameter of the first step hole is smaller than a diameter of the second step hole, a portion of the carrier is located in the second step hole, and a surface of the portion of the carrier located in the second step hole close to the first step hole abuts against the insert tongue.

9. The laser lamp as claimed in claim 8, wherein the avoiding groove is in communication with the second step hole, the carrier is arranged in the second step hole, and teeth are arranged on a surface of the carrier facing a hole wall of the second step hole.

10. The laser lamp as claimed in claim 7, wherein the carrier defines a carrier hole extending through the carrier and configured to transmit the light, the grating sheet and the clamping member are arranged in the carrier hole.

11. The laser lamp as claimed in claim 10, wherein the carrier hole comprises a third step hole and a fourth step hole in communication with each other, a diameter of the third step hole is smaller than a diameter of the fourth step hole, the grating sheet and the clamping member are arranged in the fourth step hole, the grating sheet is arranged closer to the third step hole than the clamping member, the clamping member is configured to cooperate with the carrier to enable a surface of the grating sheet close to the third step hole to abut against the carrier.

12. The laser lamp as claimed in claim 7, wherein the grating insert is detachably arranged on the insert tongue.

13. The laser lamp as claimed in claim 7, comprising:

a mounting housing, defining a mounting space; wherein the laser module and the drive module are arranged in the mounting space, the mounting housing defines an insert hole in communication with the mounting space and a light outlet in communication with outside of the mounting housing; the grating-sheet insert module is arranged in the insert hole and the mounting space, and configured to slide out of or into the mounting space from the insert hole;

wherein the grating-sheet insert module is further configured to:

slide in a sliding direction of the grating-sheet insert module to a location where a part of the drive module is located in the avoiding groove; and slide in the sliding direction of the grating-sheet insert module to a location where the part of the drive module is located out of the avoiding groove; and wherein the light outlet is configured to enable the light to be emitted out of the mounting space.

14. The laser lamp as claimed in claim 13, comprising:

a grating module, arranged at the light outlet, arranged on the grating-sheet insert module, and configured to enable the light to transmit therethrough.

15. The laser lamp as claimed in claim 13, further comprising:

a limit base, defining a limit space, adjacent to the insert hole, and defining an avoiding opening in communication with the limit space and the insert hole, and the avoiding opening being defined at a position corresponding to the insert hole; wherein the limit space is configured to accommodate the grating-sheet insert module and limit a location of the grating-sheet insert module, the grating-sheet insert module is configured to slide out of or into the limit space from the avoiding opening, the limit base defines an avoiding channel, a portion of the drive module is arranged in the avoiding channel, another portion of the drive module is arranged in the limit space, and the portion of the drive module arranged in the limit space is in transmission connection with the grating insert.

16. The laser lamp as claimed in claim 15, wherein the insert tongue comprises a snapping portion at a position corresponding to the insert hole, and the snapping portion is configured to seal the insert hole.

17. A lawn lamp, comprising:

a mounting housing;

a mounting bracket, received in the mounting housing;

a laser module, mounted on the mounting bracket and configured to emit light;

a grating-sheet insert module, comprising:

an insert tongue, detachably connected to the mounting housing and defining a mounting hole extending through the insert tongue; and a grating insert, detachably arranged in the mounting hole, configured to enable the light emitted by the laser module to transmit therethrough, and rotatable around a central axis of the mounting hole; and a drive module, arranged on the mounting bracket, in transmission connection with the grating insert, and configured to drive the grating insert to rotate around the central axis of the mounting hole;

wherein the grating insert comprises:

a carrier, arranged in the mounting hole, in contact with a hole wall of the mounting hole, and rotatable around the central axis of the mounting hole; and a clamping member, arranged on the carrier and configured to cooperate with the carrier to clamp a grating sheet;

wherein an engaging block is arranged on the clamping member, an engaging slot is defined on the carrier, and the engaging block is engaged with and fixed to the engaging slot.

18. The lawn lamp as claimed in claim 17, wherein the grating insert comprises:

a grating sheet, mounted on the carrier and configured to enable the light entering the mounting hole to transmit therethrough;

the carrier is in contact with the drive module.

19. The lawn lamp as claimed in claim 17, wherein the carrier defines a carrier hole extending through the carrier and configured to transmit the light, the grating sheet and the clamping member are arranged in the carrier hole;

the carrier hole comprises a third step hole and a fourth step hole in communication with each other, a diameter of the third step hole is smaller than a diameter of the fourth step hole, the grating sheet and the clamping member are arranged in the fourth step hole, the grating sheet is arranged closer to the third step hole than the clamping member, the clamping member is configured to cooperate with the carrier to enable a surface of the grating sheet close to the third step hole to abut against the carrier.

* * * * *